(12) United States Patent
Smith et al.

(10) Patent No.: US 6,804,447 B2
(45) Date of Patent: Oct. 12, 2004

(54) FIBER PANEL WITH INTEGRATED COUPLERS

(75) Inventors: Trevor D. Smith, St. Louis Park, MN (US); Dennis J. Krampotich, Shakopee, MN (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

(21) Appl. No.: 10/289,167

(22) Filed: Nov. 5, 2002

(65) Prior Publication Data

US 2004/0086252 A1 May 6, 2004

(51) Int. Cl.$^7$ ................................. G02B 6/00
(52) U.S. Cl. ........................................ 385/134
(58) Field of Search ............... 385/134, 135, 385/52

(56) References Cited

U.S. PATENT DOCUMENTS

| | | | |
|---|---|---|---|
| 4,373,776 A | 2/1983 | Purdy | 385/135 |
| 4,792,203 A | 12/1988 | Nelson et al. | 385/135 |
| 4,840,449 A | 6/1989 | Ghandeharizadeh | 385/135 |
| 4,898,448 A | 2/1990 | Cooper | 385/92 |
| 4,995,688 A | 2/1991 | Anton et al. | 385/53 |
| 5,066,149 A | 11/1991 | Wheeler et al. | 385/135 |
| 5,127,082 A | 6/1992 | Below et al. | 385/135 |
| 5,142,607 A | 8/1992 | Petrotta et al. | 385/135 |
| 5,247,603 A | 9/1993 | Vidacovich et al. | 385/135 |
| 5,285,515 A | 2/1994 | Milanowski et al. | 385/135 |
| 5,339,379 A | 8/1994 | Kutsch et al. | 385/135 |
| 5,363,466 A | 11/1994 | Milanowski et al. | 385/135 |
| 5,402,515 A * | 3/1995 | Vidacovich et al. | 385/135 |
| 5,497,444 A | 3/1996 | Wheeler | 385/135 |
| 5,511,144 A | 4/1996 | Hawkins et al. | 385/135 |
| 5,640,481 A | 6/1997 | Llewellyn et al. | 385/134 |
| 5,717,810 A | 2/1998 | Wheeler | 385/135 |
| 5,758,003 A | 5/1998 | Wheeler et al. | 385/134 |
| 5,887,106 A | 3/1999 | Cheeseman et al. | 385/135 |
| 5,917,984 A | 6/1999 | Roseler et al. | 385/135 |
| 5,946,440 A | 8/1999 | Puetz | 385/135 |
| 6,009,224 A | 12/1999 | Allen | 385/135 |
| 6,215,938 B1 | 4/2001 | Reitmeier et al. | 385/135 |
| 6,226,436 B1 | 5/2001 | Daoud et al. | 385/135 |
| 6,236,795 B1 | 5/2001 | Rodgers | 385/134 |
| 6,438,310 B1 | 8/2002 | Lance et al. | 385/135 |
| 6,504,988 B1 | 1/2003 | Trebesch et al. | 385/135 |
| 2003/0007767 A1 | 1/2003 | Douglas et al. | |

FOREIGN PATENT DOCUMENTS

| WO | WO 95/07480 | 9/1994 |
|---|---|---|
| WO | WO 96/10203 | 9/1995 |

* cited by examiner

Primary Examiner—Tulsidas C. Patel
(74) Attorney, Agent, or Firm—Merchant & Gould P.C.

(57) ABSTRACT

The present invention relates to a telecommunications panel for connecting optical fiber cables from inter-facility cables (IFC) to fiber optic termination equipment. The telecommunications panel receives the IFC cable into a tray where the optical fibers within the cable are spliced and coupled to monitor fibers and transmission fibers. These monitor and transmission fibers are terminated at adapters within the panel for connection to cables extending to the FOT equipment. The IFC cables may be multi-strand optical fiber cables or single strand cables. The present invention also relates to a drop-in tray for use with a telecommunications panel which provides both splice and coupling devices on the same tray. The drop-in tray also includes adapters where the transmission and monitor fibers are terminated for connection to cables extending to FOT equipment.

22 Claims, 33 Drawing Sheets

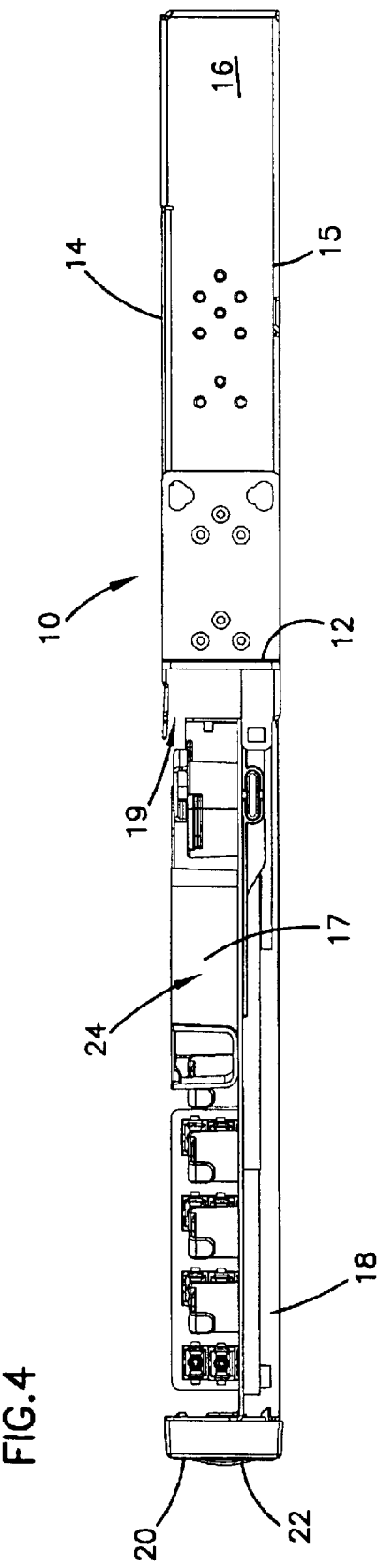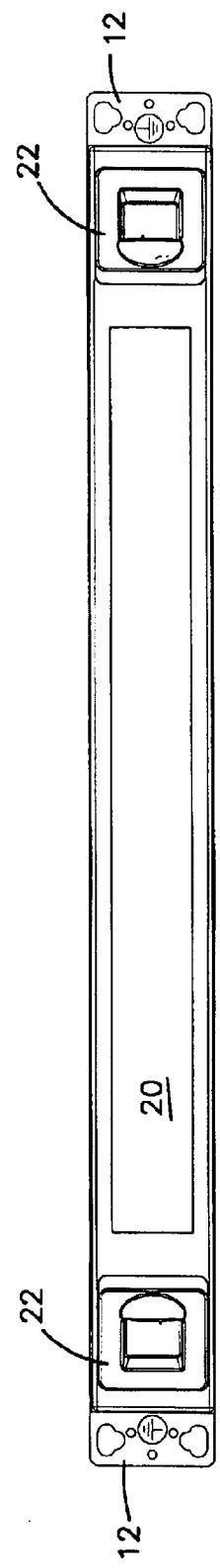
FIG.4
FIG.3

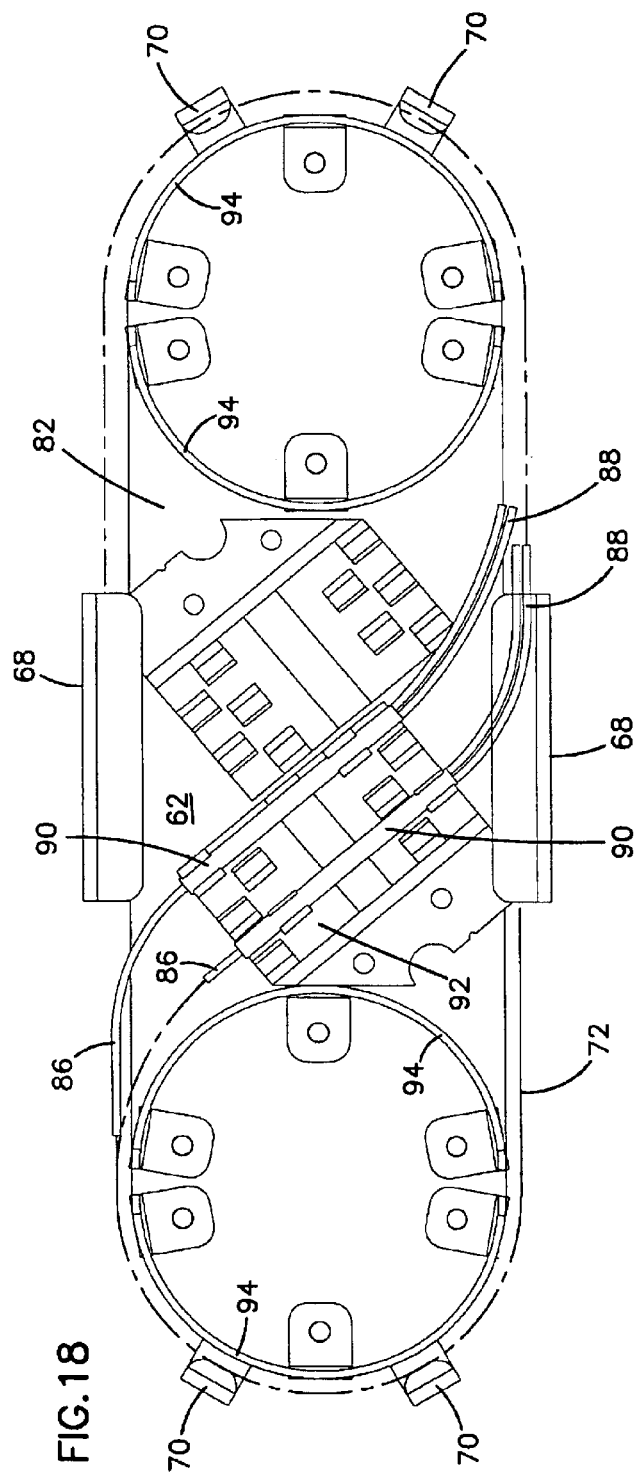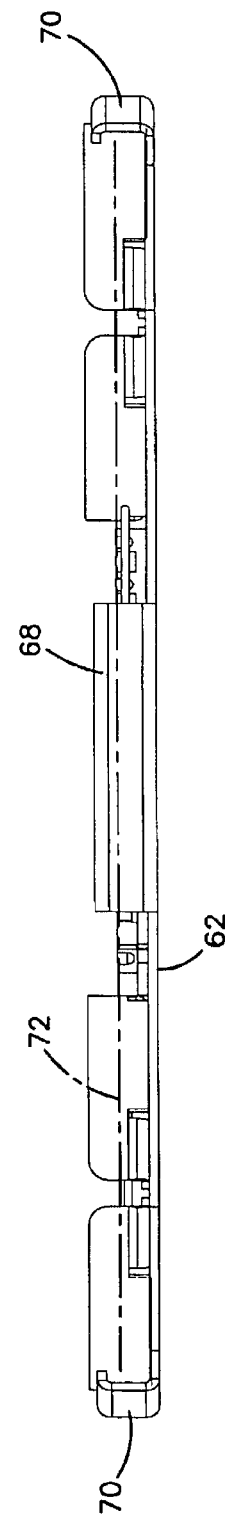
FIG.18
FIG.19

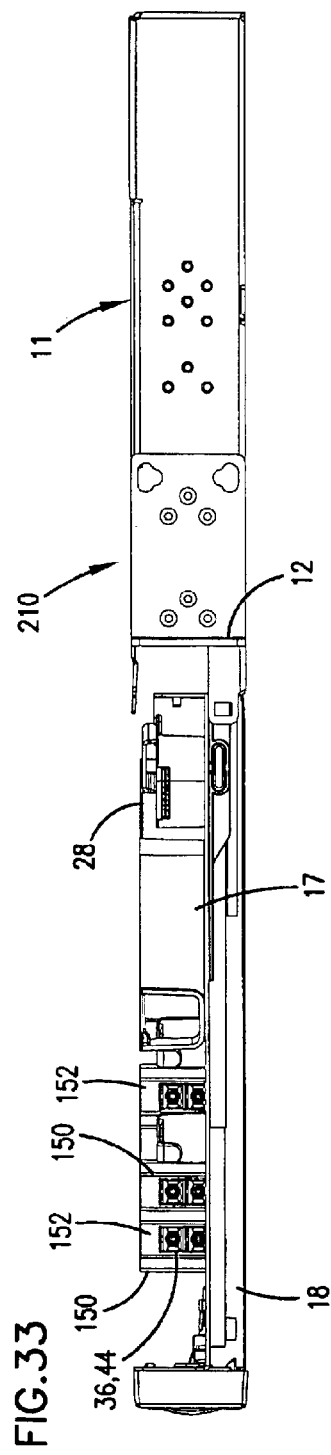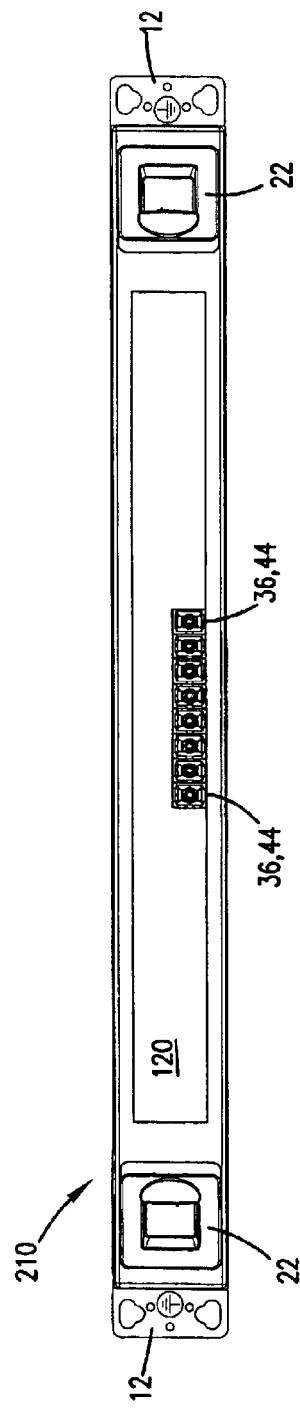
FIG.33
FIG.32

FIBER PANEL WITH INTEGRATED COUPLERS

FIELD OF THE INVENTION

The present invention generally relates to optical fiber telecommunications equipment. More specifically, the present invention relates to a optical fiber connection equipment including termination, splice holders and couplers.

BACKGROUND OF THE INVENTION

In optical fiber telecommunications installations, a variety of devices are used to optically connect fiber extending to and from operational equipment and to monitor the signals being transmitted through the fiber. An inter-facility cable (IFC) might enter an equipment rack and carry one or more strands of optical fiber. If the IFC is a multi-strand cable, the cable may be clamped to a rack mounted panel and the individual fibers within the cable separated. The smaller cables including the individual fibers may then be lead to a termination panel and terminated at a connector. From this connector, a second cable is led to a monitor panel where the second cable is connected to a coupler or splitter. The splitter separates out a portion of the optical signals transmitted through the cable into a monitor cable while allowing the rest of the signal strength to be transmitted from the second cable into a fiber optic terminal (FOT) cable for transmission to FOT equipment.

These installations of terminations, connectors and splitters allow for separation of portions of the signal transmitted from the IFC cable to the FOT equipment, without disruption of the signal being transmitted. However, these installations require several distinct panels within a rack to accomplish this connection and monitoring of signals, occupying several spaces within a telecommunications equipment rack. Improvements to the installation of these devices into a more efficient arrangement are desirable.

SUMMARY OF THE INVENTION

The present invention relates to a telecommunications connection panel for connecting optical fiber cables. The panel includes a splice tray, a coupler tray and a plurality of optical fiber adapters.

One embodiment includes a slideable drawer including terminations disposed in the drawer. A further embodiment includes front terminations disposed on a front of the drawer.

According to a preferred embodiment, a panel allows cables to be spliced to couplers which split the signal carried by the cables into two signals carried by two cables and then routed to cable terminations to define access locations for the signal carried by each cable.

According to a further embodiment, the panel can be configured to accept first cables at a first set of access locations. From the first set of access locations, further cables can extend to couplers. Further cables extend from the couplers to a second set of access locations. The second set of access locations can define a primary signal location and a monitor signal location.

BRIEF DESCRIPTION OF THE DRAWINGS

The accompanying drawings, which are incorporated in and constitute a part of the specification, illustrate several aspects of the invention and together with the description, serve to explain the principles of the invention. A brief explanation of the drawings is as follows:

FIG. 3 is a front view of the panel of FIG. 1.

FIG. 4 is a side view of the panel of FIG. 1.

FIG. 18 is a top view of the coupler tray of FIG. 10.

FIG. 19 is a front view of the coupler tray of FIG. 18.

FIG. 32 is a front view of the panel of FIG. 30.

FIG. 33 is a side view of the panel of FIG. 30.

DETAILED DESCRIPTION OF THE PREFERRED EMBODIMENT

Reference now will be made in detail to exemplary aspects of the present invention that are illustrated in the accompanying drawings. Wherever possible, the same reference numbers will be used throughout the drawings to refer to the same or like parts.

Figure 1:
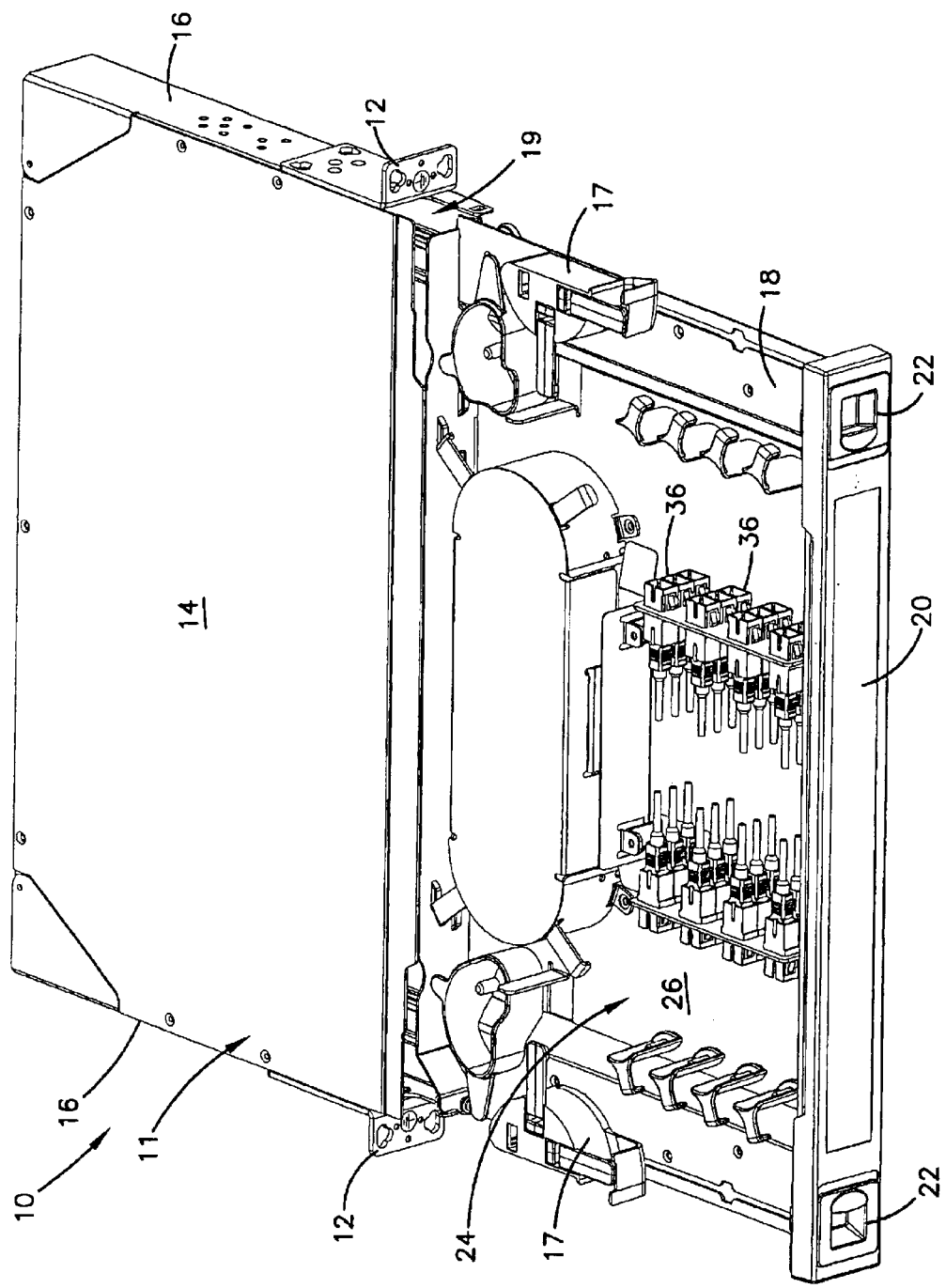
FIG. 1 is a front perspective view of a telecommunications panel in accordance with the present invention, including optical fiber connection devices mounted to a drop-in plate, the plate mounted to a sliding drawer and the drawer in an open position.
Figure 2:
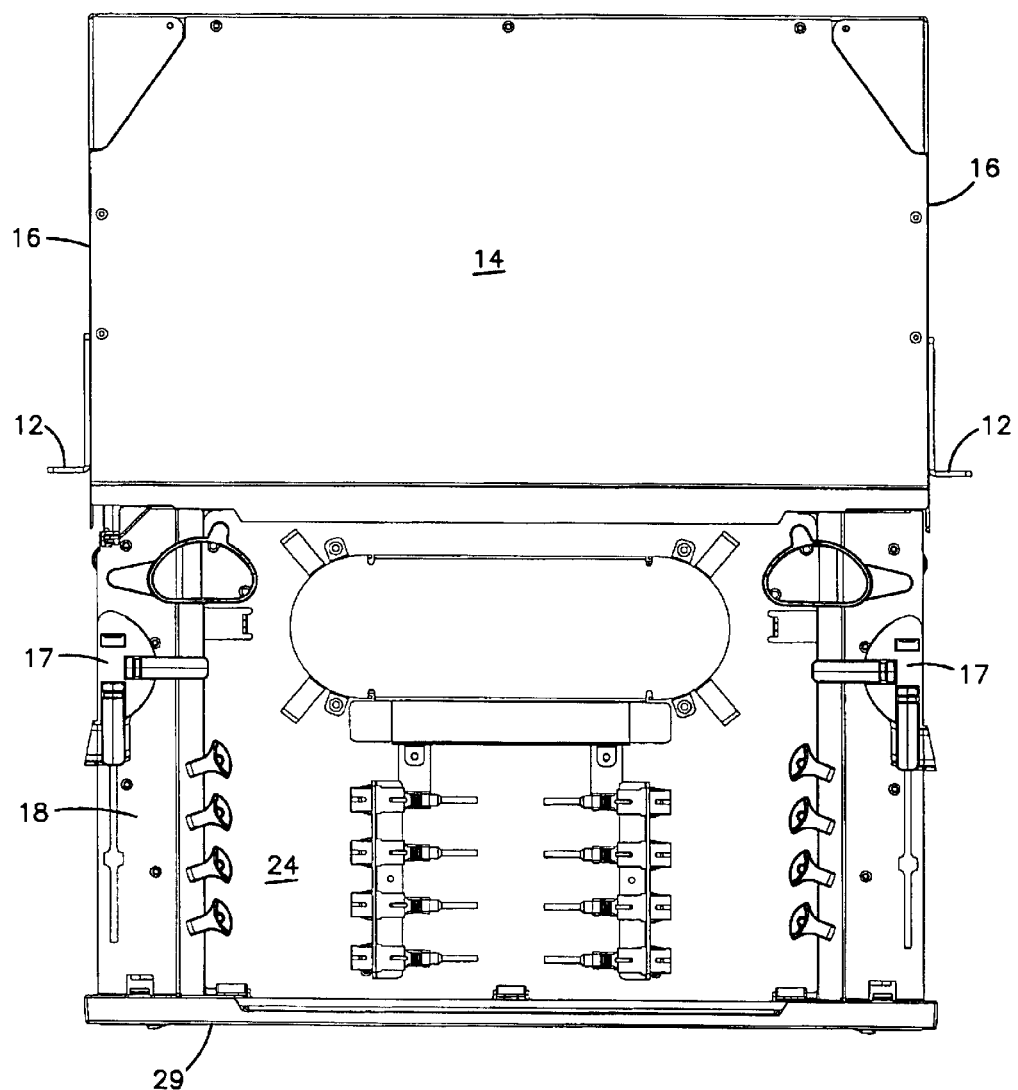
FIG. 2 is a top view of the panel of FIG. 1.
Figure 5:
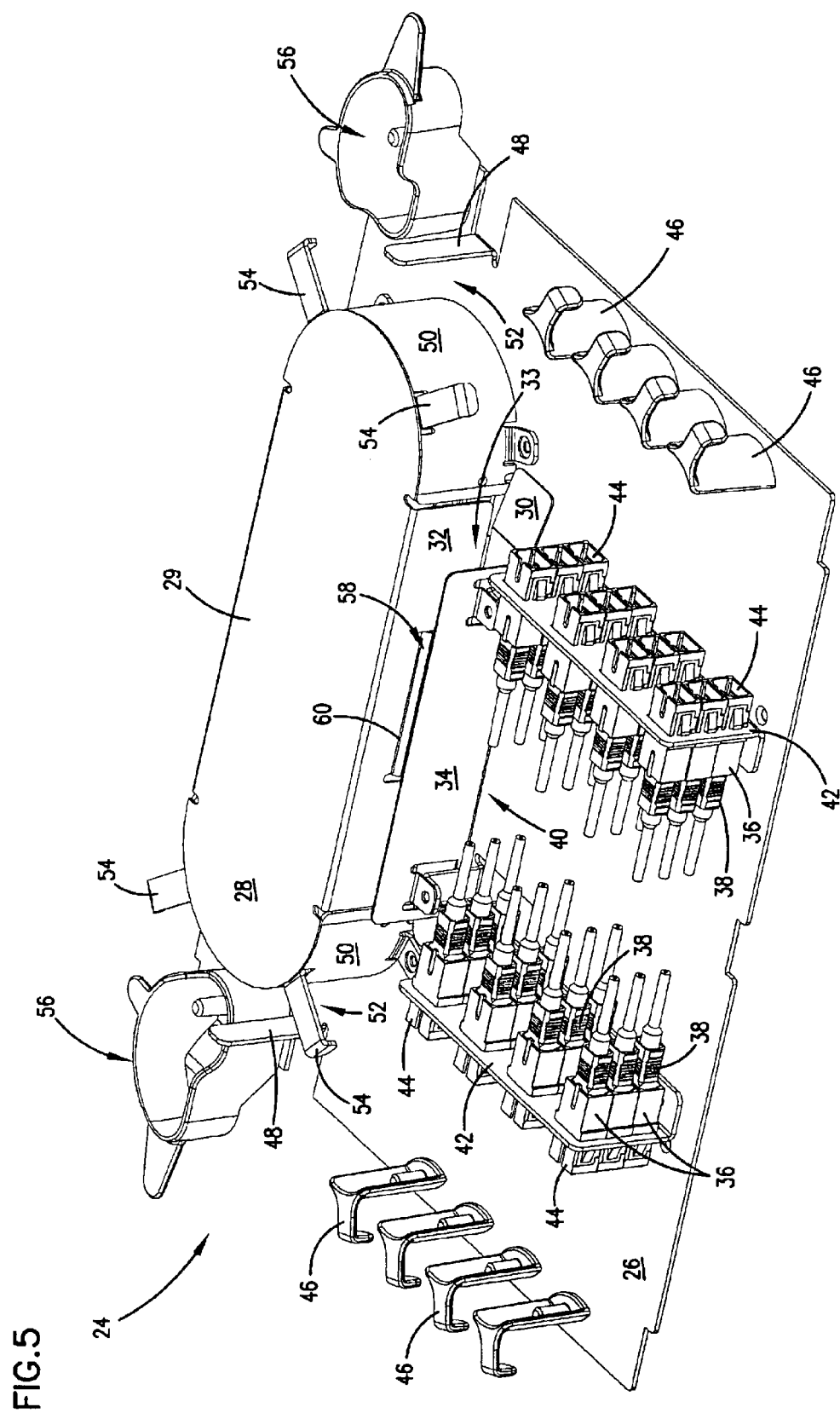
FIG. 5 is a front perspective view of the plate of FIG. 1.
Figure 6:
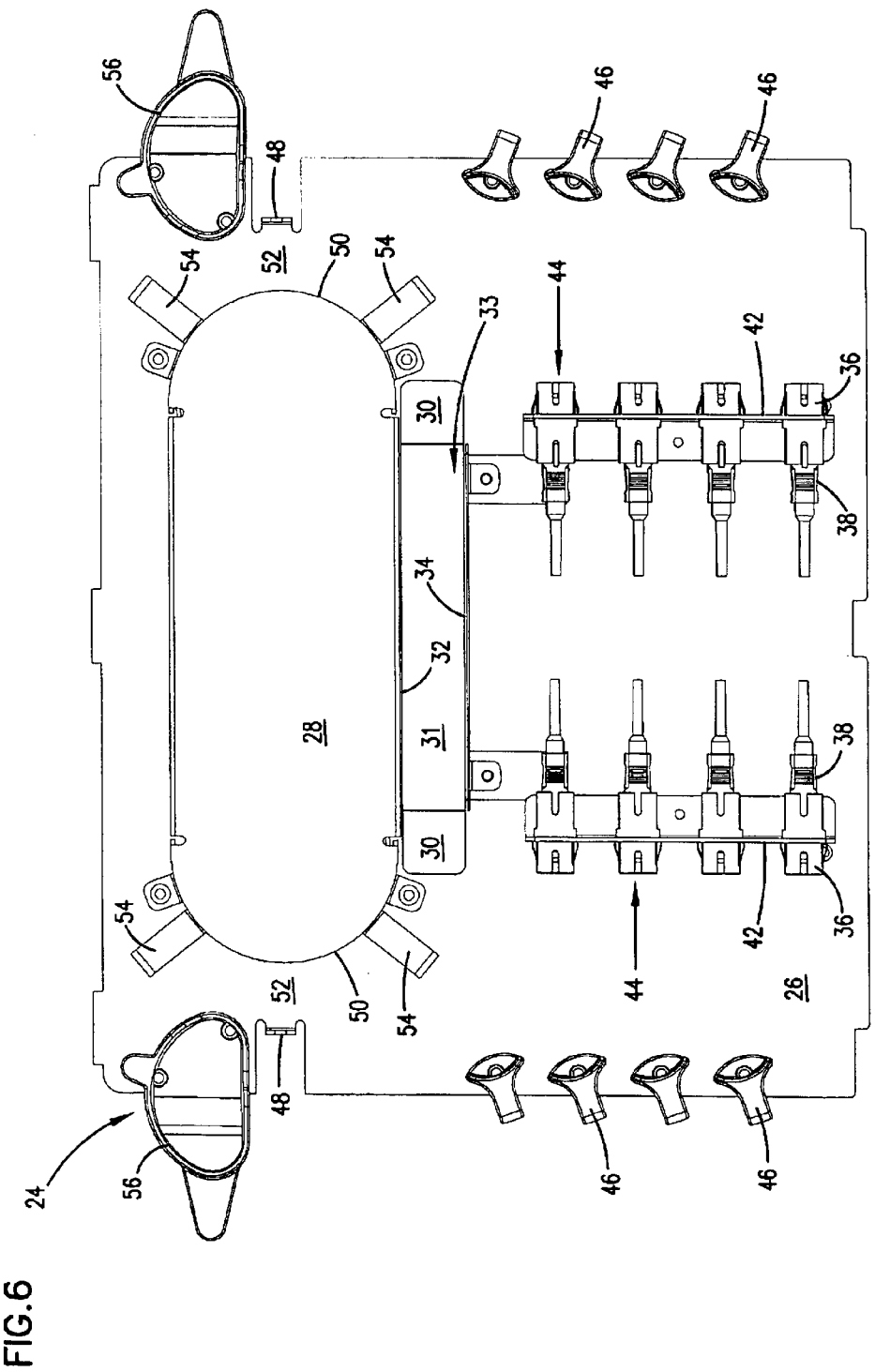
FIG. 6 is a top view of the plate of FIG. 5.
Figure 7:
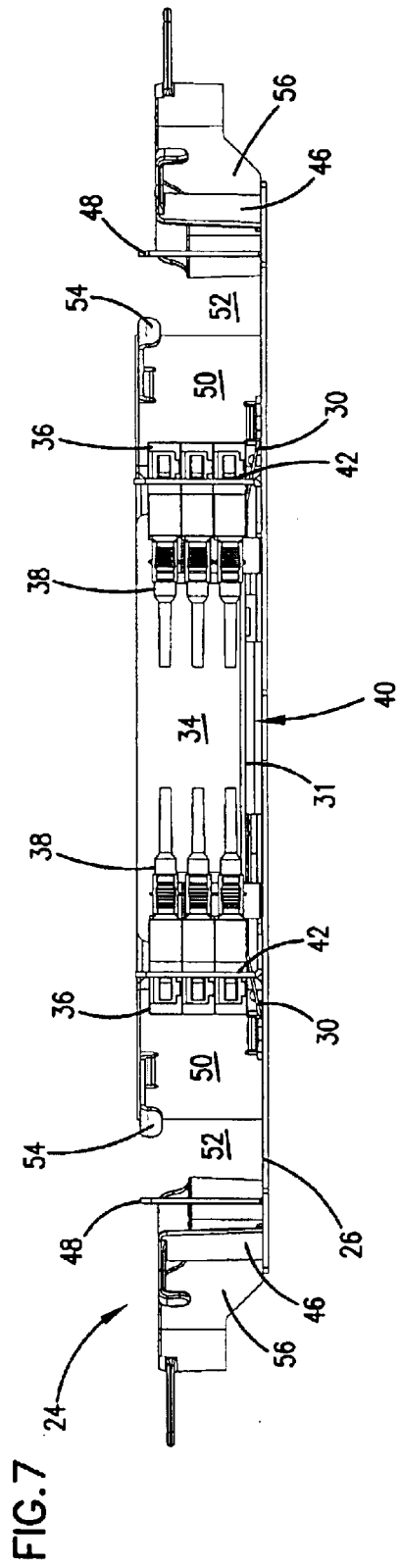
FIG. 7 is a front view of the plate of FIG. 5.
Figure 8:
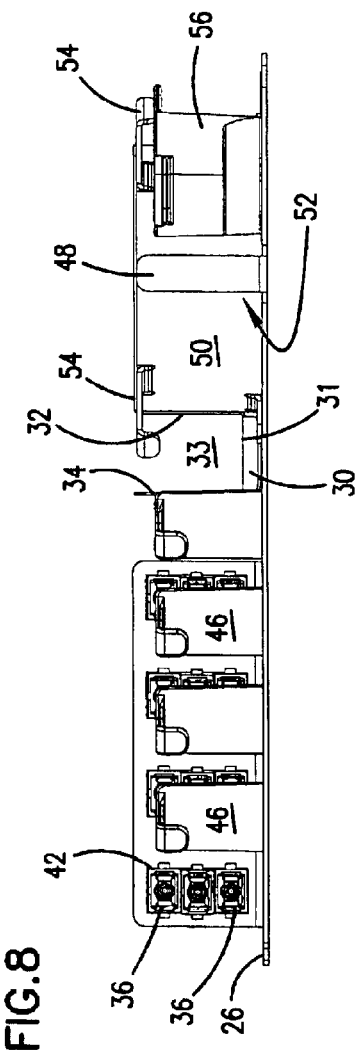
FIG. 8 is a side view of the plate of FIG. 5.

It is desirable to provide monitoring or other splitting of signals transmitted within an optical fiber telecommunications installation without interrupting the flow of signals between IFC cables and FOT equipment mounted within the installation. Such a splitting of the signals carried by the IFC cable is provided by a panel 10, as shown in FIG. 1. Panel 10 provides the ability to terminate the optical fibers within an IFC or other fiber optic transmission cable. Panel 10 connects the terminated fibers to couplers for tapping a portion of the signal carried by the fibers into a first cable and another portion of the signal into a second cable and includes a plurality of adapters 36 for connecting both of these cables extending from the coupler for transmission of the signals to FOT equipment. As an example, a coupler may split the signal so that approximately ten percent is directed for monitoring and ninety percent is directed for the transmission to the FOT equipment. Alternatively, the signal could be split equally between the fibers extending from the coupler.

Referring now to FIGS. 1 through 4, panel 10 includes a drawer 18 slidably mounted within a housing 11. Housing 11 includes a top 14, opposing sides 16, and a bottom 15, defining a front opening 19. Drawer 18 is shown in an open position, allowing access to a drop-in plate 24. When drawer 18 is in the closed position, a front plate 20 closes off front opening 19 and a pair of releasable latches 22 hold drawer 18 in the closed position. A flange 12 extends from each side 16 to permit mounting of panel 10 to a telecommunications equipment rack. Alternatively, flanges 12 permit the mounting of panel 10 to any fixture having appropriately spaced mounting points.

Drawer 18 is slidably mounted within housing 11 as described in application Ser. No. 09/649,398 (co-pending and commonly assigned), which is a continuation-in-part of application Ser. No. 09/490,379, now issued as U.S. Pat. No. 6,438,310, and application Ser. No. 09/900,465 (co-pending and commonly assigned), each of which is incorporated herein by reference. Various drawers and drop-in plates are disclosed. Drop-in plate 24 of the present invention drops into drawer 18 in a similar manner as the earlier applications. Cables entering and exiting drawer 18 are managed by a moveable take-up mechanism 17 which moves in a synchronized manner to ensure that cables do not bend too sharply when drawer 18 is being opened or closed. The earlier applications show various moveable take up mechanisms for managing the incoming and exiting cables.

Figure 39:
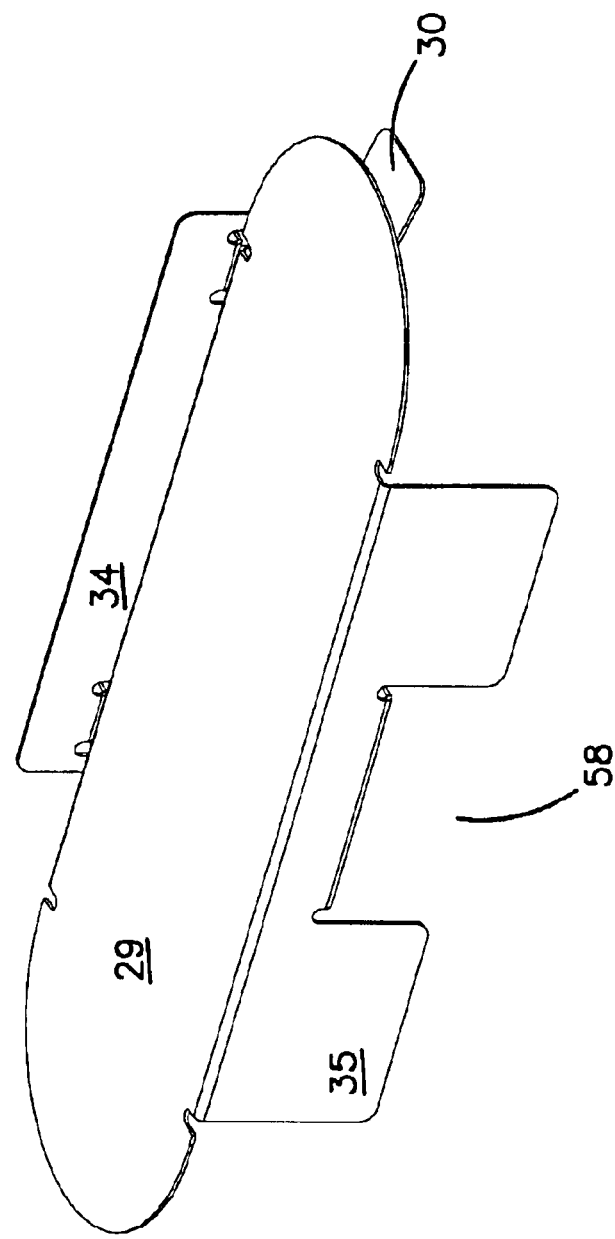
FIG. 39 is a rear perspective view of the splice housing cover of FIG. 9.

Referring now to FIGS. 5 through 8, drop-in plate 24 is shown removed from drawer 18 of panel 10. Drop-in plate 24 includes a mounting plate 26 and a splice housing 28 mounted adjacent a rear edge of plate 26. Closing the top of splice housing 28 is a splice housing cover 29, shown in additional detail in FIGS. 9 and 39, including a front wall 32, and an offset wall 34 with a floor 31 extending therebetween. Floor 31 is elevated above plate 26 defining a cable space 40 beneath floor 31 and above plate 26. A ramp 30 extends from either end of floor 31 and transition from the elevation of floor 31 to that of plate 26. Defined above floor 31 between walls 32 and 34 is a trough 33. Cover 29 also includes a rear wall 35 opposite front wall 32. Both front wall 32 and rear wall 35 include an opening 58 into which a portion of trays within splice housing 28 (described in further detail below) extend.

Mounted adjacent each rear corner of drop-in plate 24 is a cable entry radius protector 56. A curved end wall 50 of splice housing 28 is positioned next to each radius protector 56. A cable channel 52 is defined between radius protector 56, end wall 50 and a vertical finger 48 on each end of splice housing 28. A plurality of fingers 54 extend along an upper edge of wall 50 providing protection against cables within channel 52 from extending above wall 50 and potentially being damaged when drawer 18 slides between the open and closed positions.

Mounted between splice housing 28 and a front edge of drop-in plate 24 are a pair of bulkheads 42 to which adapters 36 are mounted. Bulkheads 42 are positioned so that cables extending through cable space 40 may be directed to a connector 36 within bending too sharply and violating bend radius rules for optical fiber. As shown in the FIGS., a terminated cable end or connector 38 is inserted into a first end of each adapter 36. Connectors 38 are shown for illustration only. The portions of the optical fiber extending through cable space 40 to connectors 38 are not shown to provide additional clarity in the drawing and description of the components mounted to plate 26.

Adapters 36 are shown as SC adapters. It is understood that other types and styles of fiber optic adapters 36 and mating connectors 38 may be mounted to bulkheads 42 within the present invention. An open end 44 of each adapter 36 is available for connecting to FOT cables or patch cables for connecting to other telecommunications equipment. Radius protection devices 46 are provided along the sides of plate 26 corresponding to the location of each vertically oriented column of three adapters 36. Protection devices 46 provide bend radius protection for these FOT or patch cables extending from adapters 36 as these cables are transitioned into channels 52 for exit through the side of panel 10.

Two bulkheads 42 are mounted to plate 26 and are configured to mount up to twelve adapters 36 each, for a total capacity of twenty-four adapters 36 in panel 10. It is understood that bulkheads 42 may be configured to mount more or fewer adapters 36 (as shown in FIGS. 21 through 38, below). It is also understood that a panel 10 may not have its full capacity of adapters 36 mounted, depending on the number of cables entering and exiting panel 10. Adapters 36 snap into bulkheads 42. One type of adapter is shown in U.S. Pat. No. 5,317,663.

Figure 9:
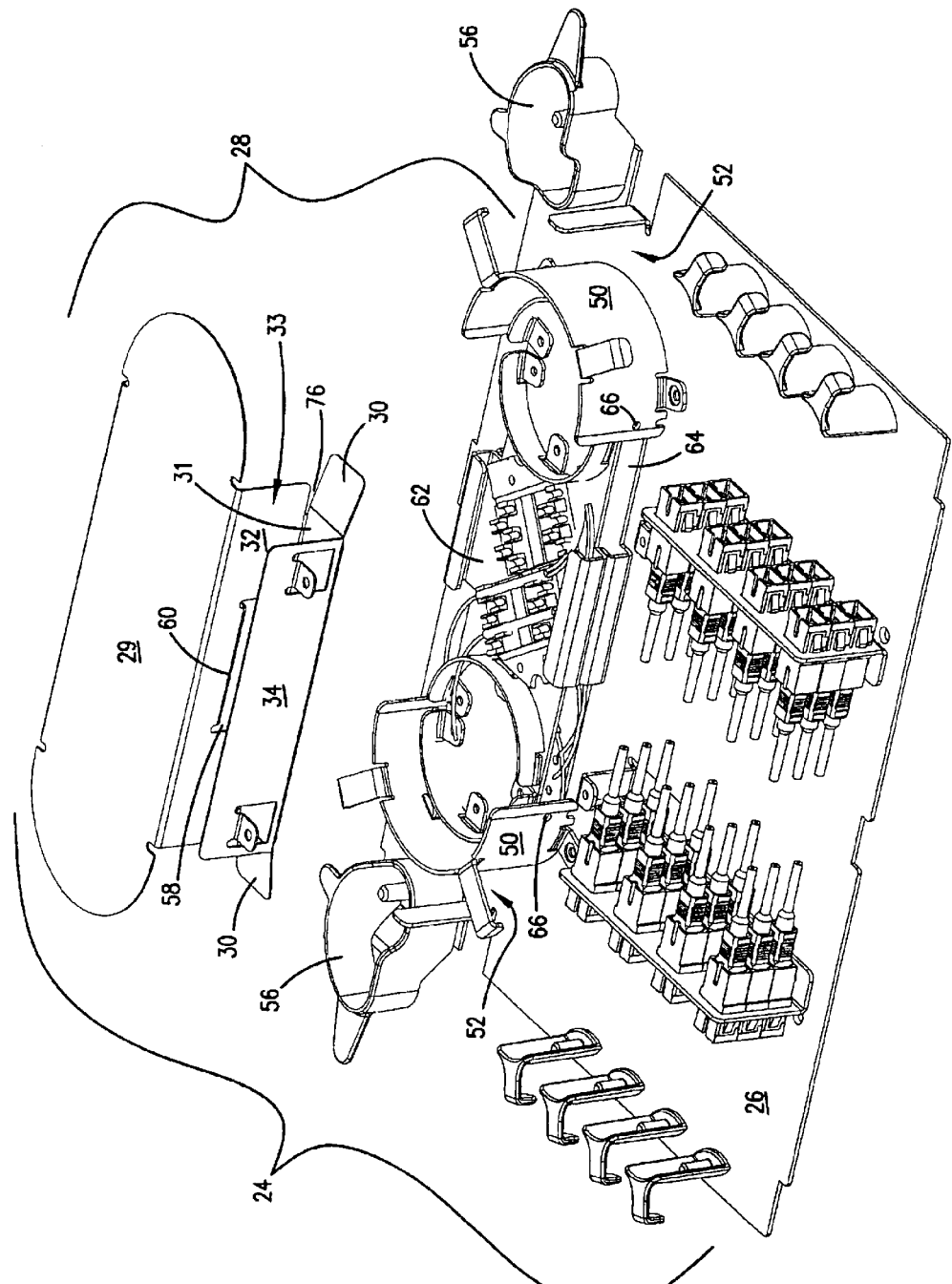
FIG. 9 is a front perspective partially exploded view of the plate of FIG. 5 with the splice housing cover exploded.
Figure 9A:
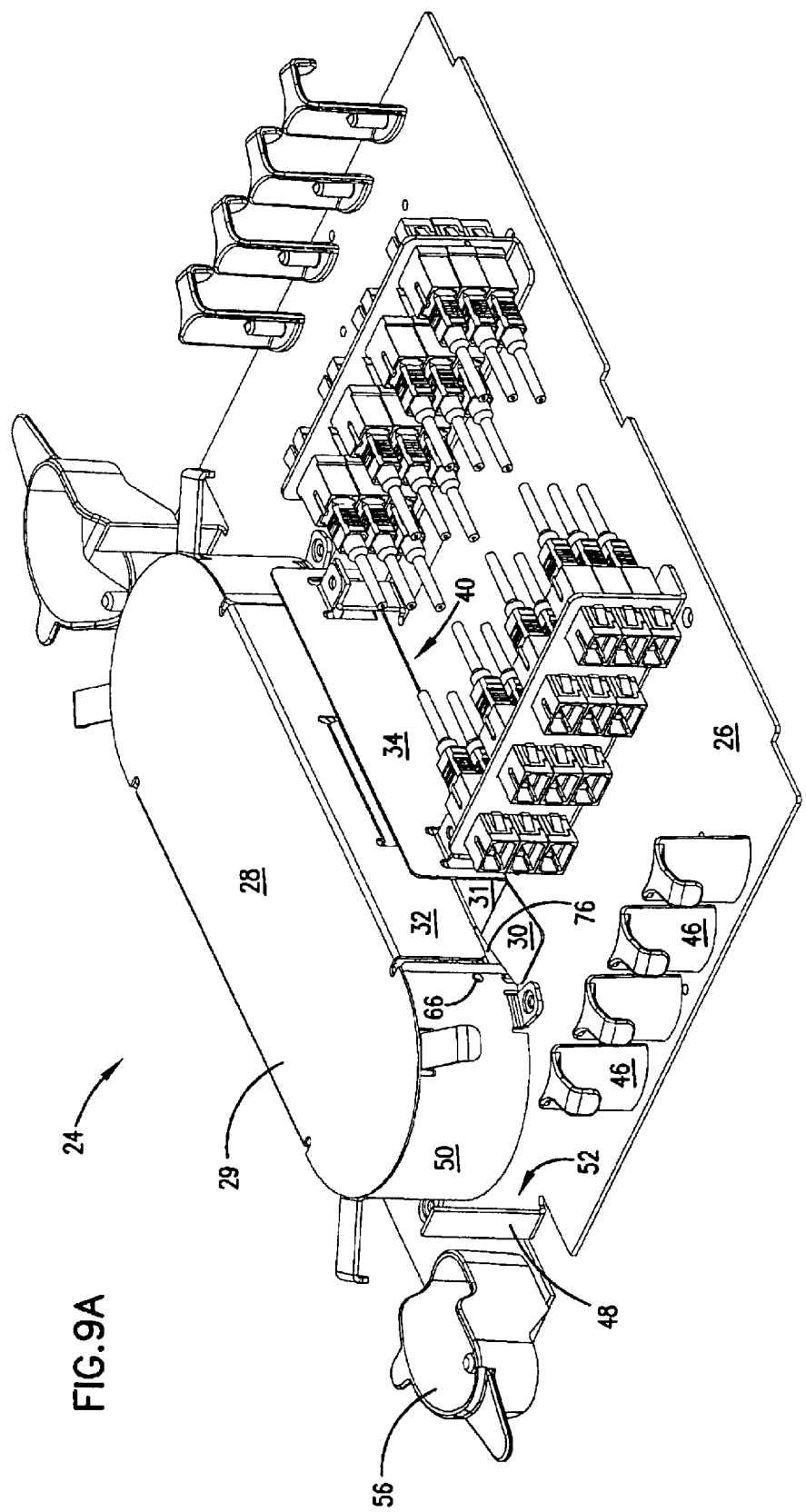
FIG. 9A is a second front perspective partially exploded view of the plate of FIG. 9.
Figure 10:
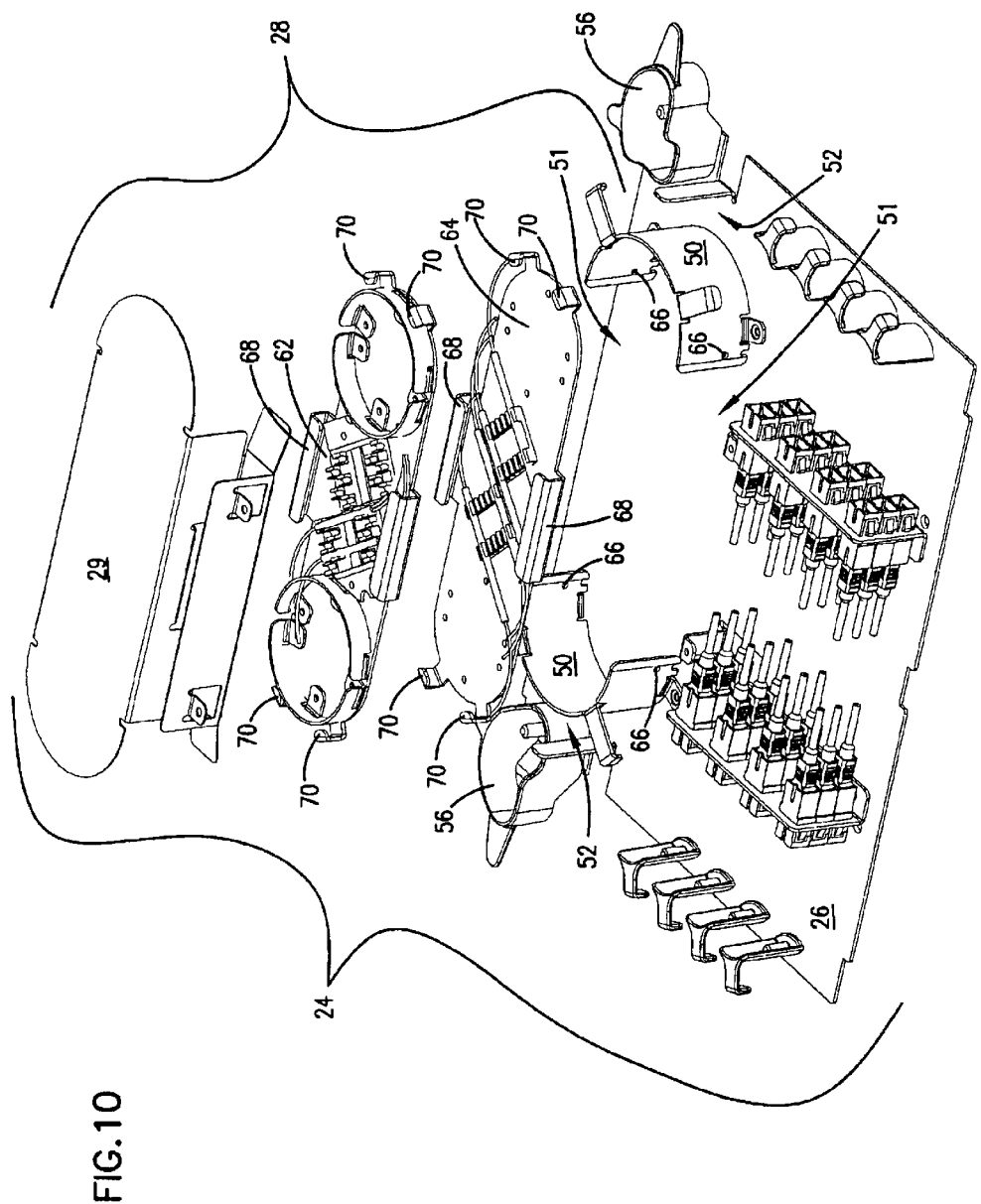
FIG. 10 is a front perspective partially exploded view of the plate of FIG. 9, with the splice tray and the coupler tray exploded.
Figure 10A:
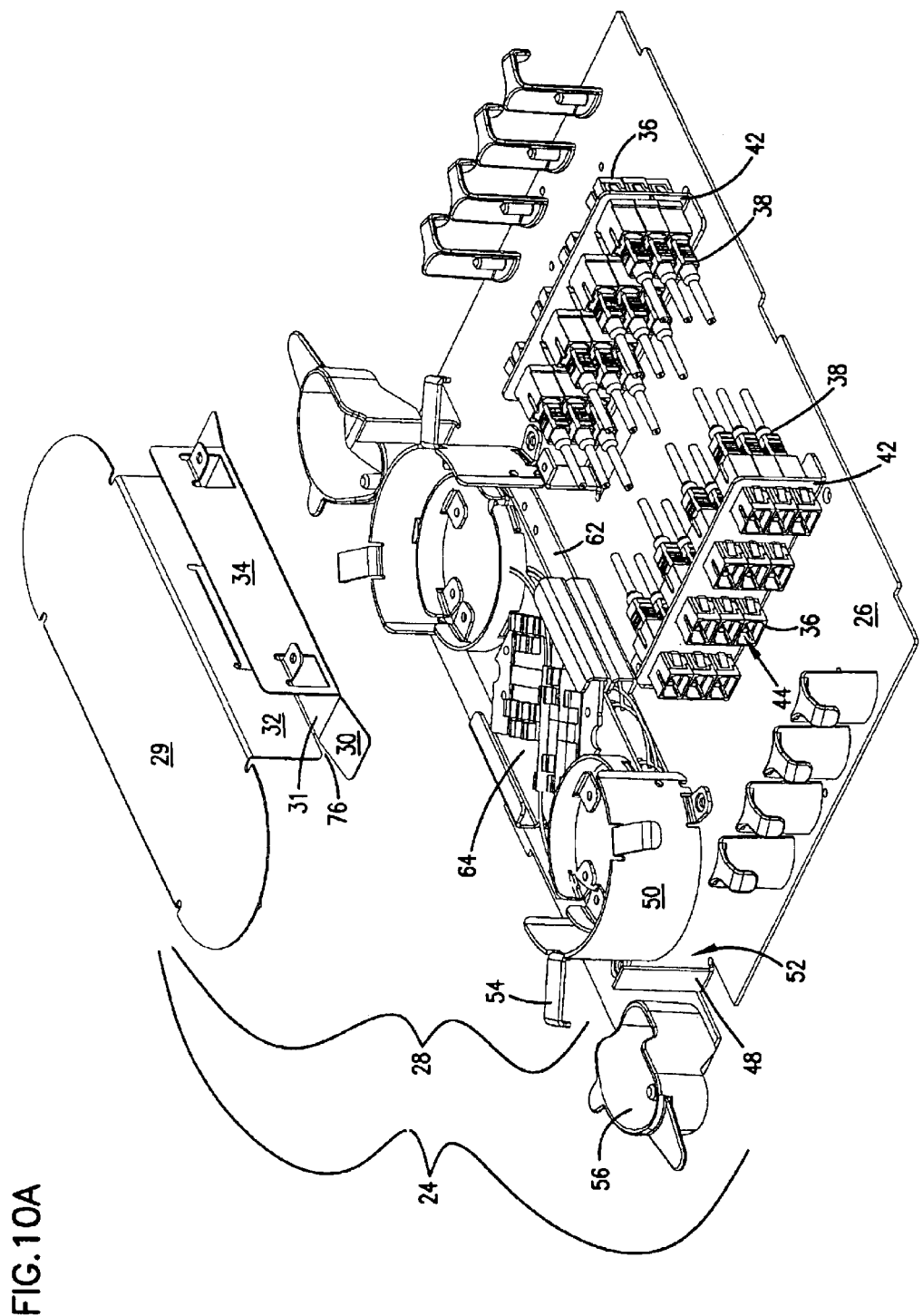
FIG. 10A is a second front perspective partially exploded view of the plate of FIG. 10.
Figure 11:
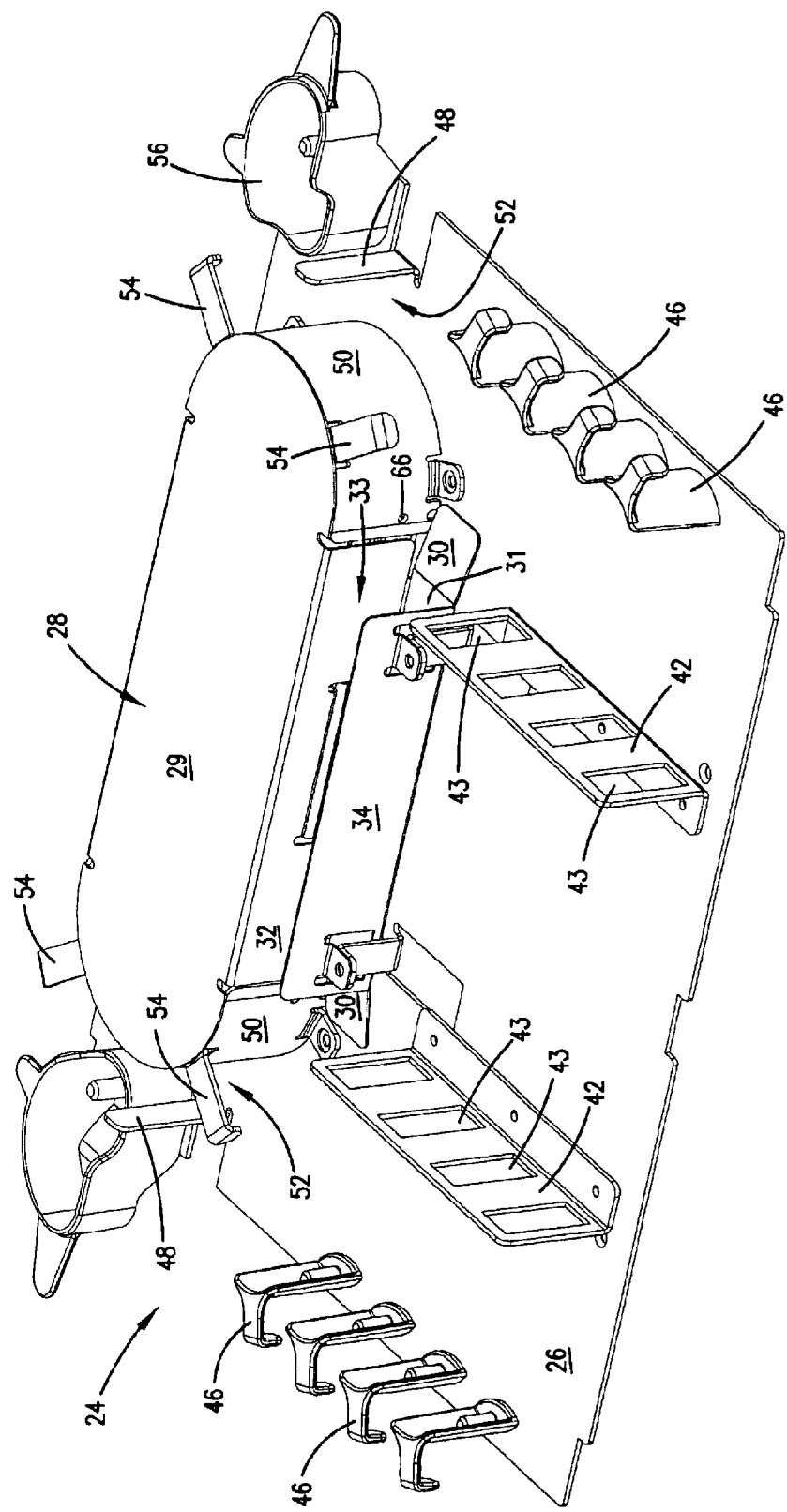
FIG. 11 is a front perspective view of the drop-in plate of FIG. 5, with the adapters removed.
Figure 12:
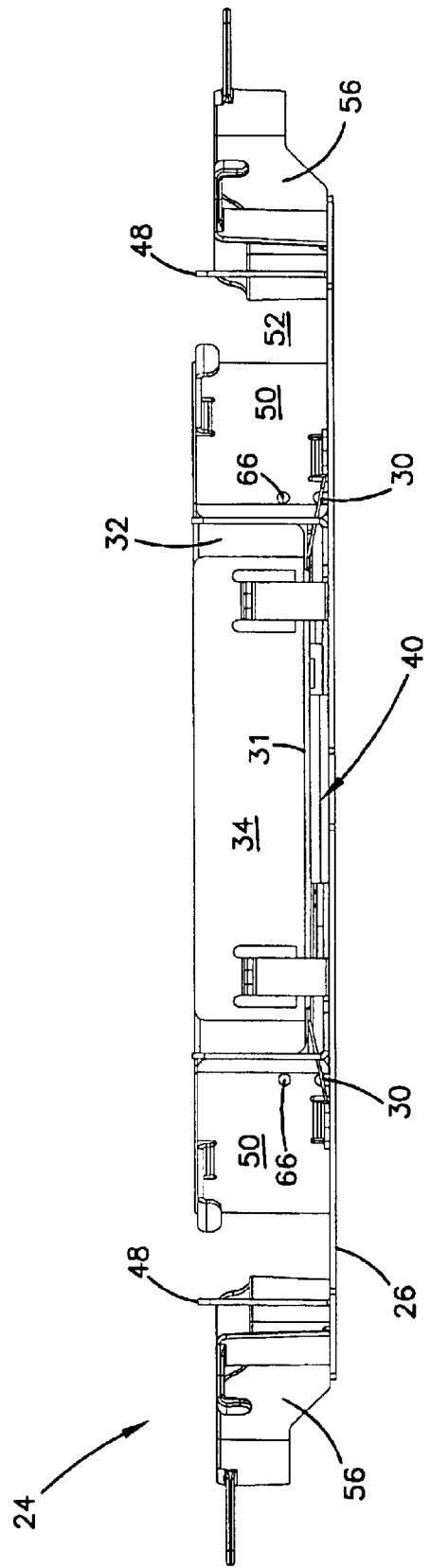
FIG. 12 is a front view of the plate of FIG. 11.
Figure 13:
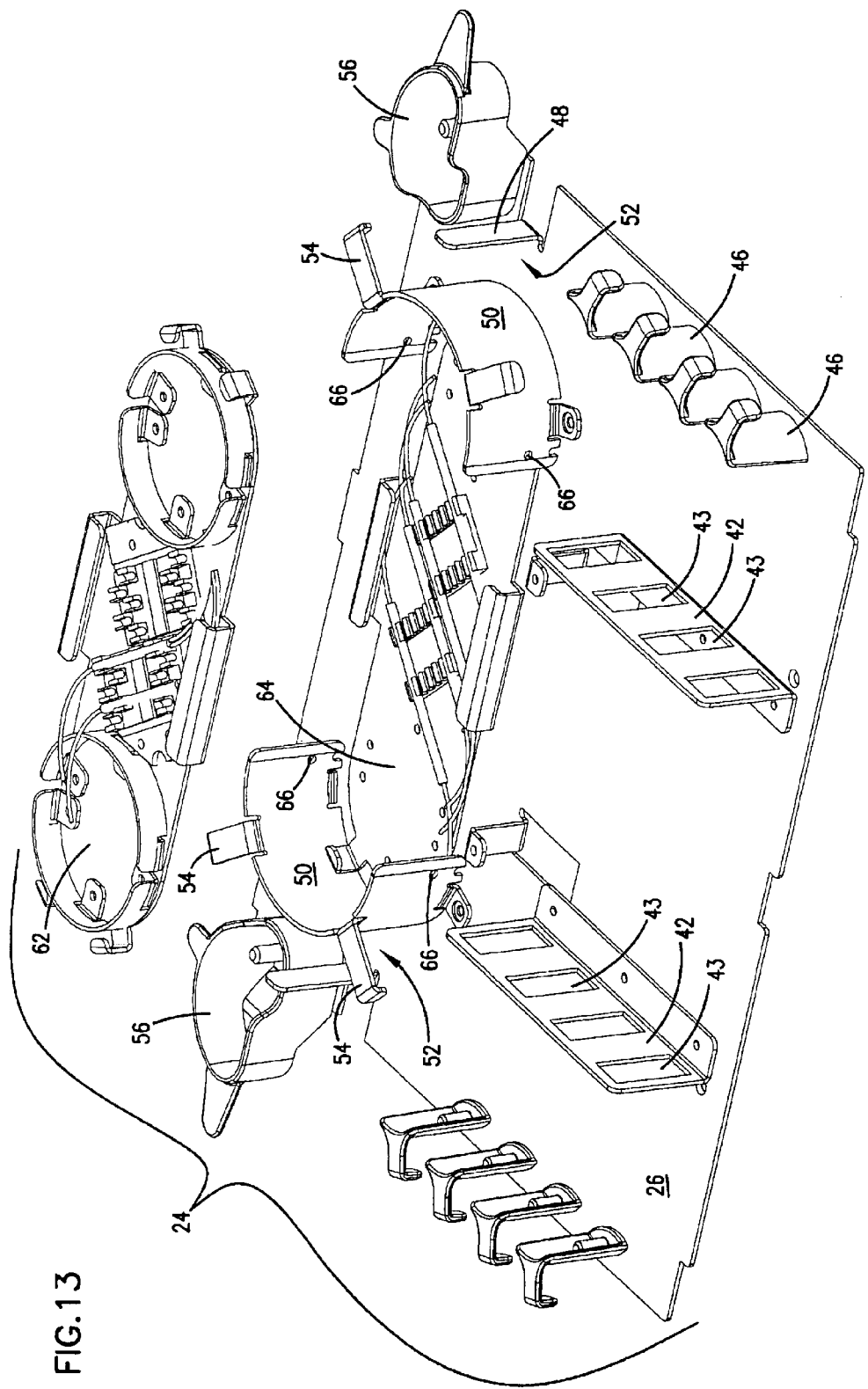
FIG. 13 is a front perspective partially exploded view of the plate of FIG. 11, with the splice housing cover removed and the coupler tray exploded.
Figure 14:
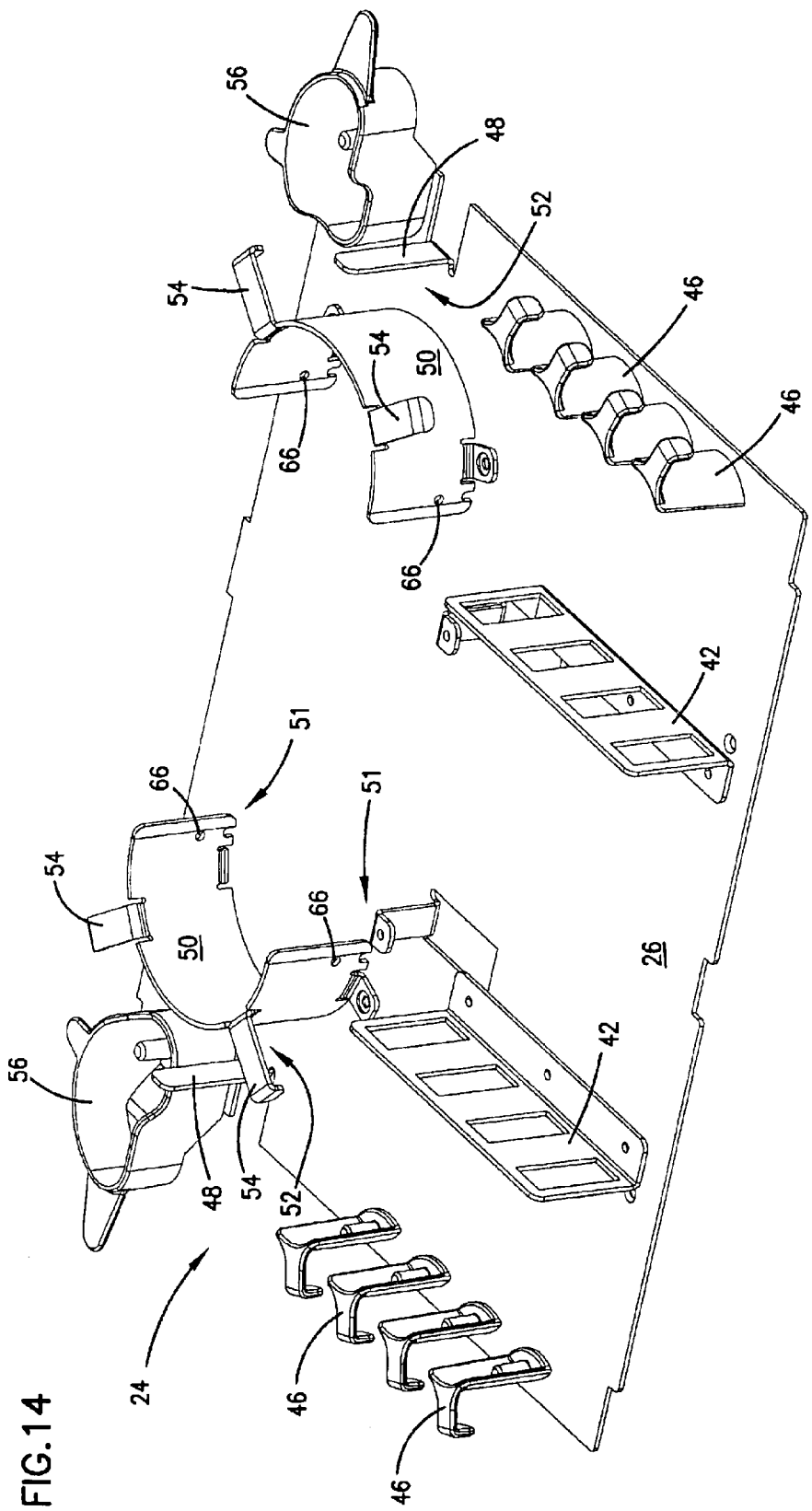
FIG. 14 is a front perspective view of the plate of FIG. 11 with the splice housing, the splice tray and the coupler tray removed.

Referring now to FIGS. 9 and 10, a coupler tray 62 and a splice tray 64 are mounted within splice housing 28 and enclosed by cover 29. Trays 62 and 64 are configured to fit within walls 50 on either end. Trays 62 and 64 are shown and described in additional detail below with reference to FIGS. 15 through 20. Walls 50 also include a cable tie off 66 adjacent an opening 51 of splice housing 28, opening 51 extending between walls 50.

FIGS. 11 through 14 show drop-in plate 24 with connectors 36 removed to more clearly show ramps 30 and cable space 40 beneath floor 31, as well as other components mounted to plate 26 as described above. A plurality of openings 43 in bulkheads 43 are provided for mounting adapters 36. Each opening 43 is configured to mount three adapters 36.

Referring now to FIGS. 15 through 20, trays 62 and 64 each include a front and a rear C-channel 68, and a pair of fingers 70 extending from each end adjacent an inner surface of wall 50. C-channels 68 and fingers 70 cooperate to form a fiber path 72 on tray 62, as shown by the dashed line in FIGS. 18 and 19, and a fiber path 74 on tray 64, as shown by the dashed line in FIGS. 15 and 16. Paths 72 and 74 permit slack storage of optical fibers within splice housing 28 to provide sufficient length of fiber so that trays 62 and 64 may be removed from splice housing 28. Paths 72 and 74 also aid in the transition of the fibers from outside splice housing 28 into trays 62 and 64 and back out of splice housing 28 to connectors 36. Both trays 62 and 64 include a tray body 82 which is identical. C-channels 68 are the portions of the trays which extend within openings 58 of front wall 32 and rear 35 of cover 29.

Referring now to FIGS. 9A, 10A, 15 and 18, a possible routing for an optical fiber cable entering the side of panel 10 will be described. This routing description pertains to the use of a multi-strand optical fiber cable, such as an IFC cable. It is understood that single fiber cables may also be used with a similar routing scheme which will be described below. The IFC cable enters drop-in plate 24 adjacent radius protector 56 on the left rear of plate 24 and extends into channel 52 along wall 50 along the left side of splice housing 28. The cable is wrapped counterclockwise around walls 50 of housing 28 beneath fingers 54 and through trough 33 as needed for slack storage, preferably at least two loops. The IFC cable is tied off at tie-off 66 adjacent the left front of splice housing 28. The IFC cable includes eight strands of optical fiber which are separated from the cable and from each other before entering splice housing 28 through an opening 76 between wall 32 and ramp 30 and floor 31. Upon entry into splice housing 28, the fibers extend through front C-channel 68 of tray 64 and extend counterclockwise about path 74. To provide sufficient slack for manipulation and removal of tray 64 from splice housing, the fibers should extend preferably at least two loops about path 74.

Figure 15:
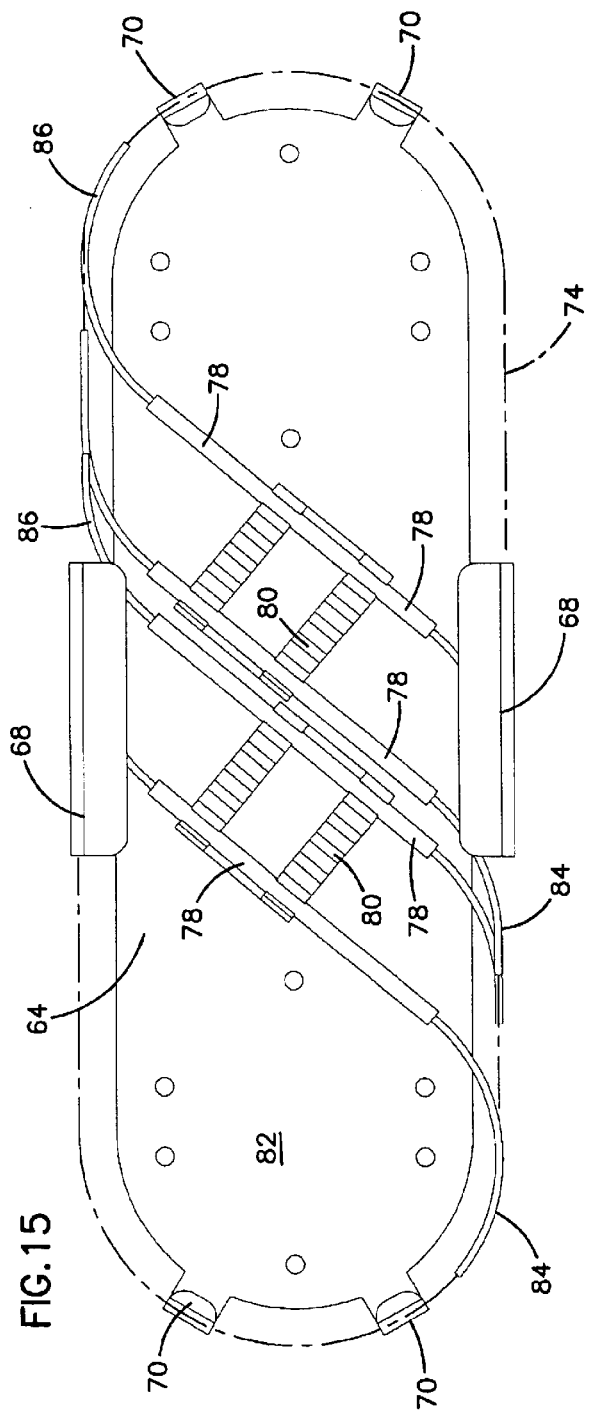
FIG. 15 is a top view of the splice tray of FIG. 10.
Figure 16:
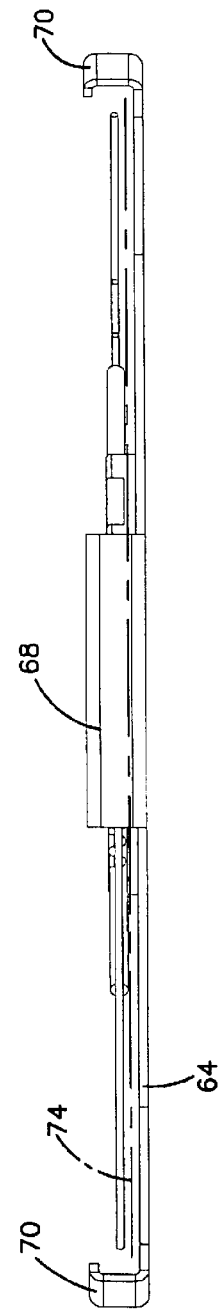
FIG. 16 is a front view of the splice tray of FIG. 15
Figure 17:
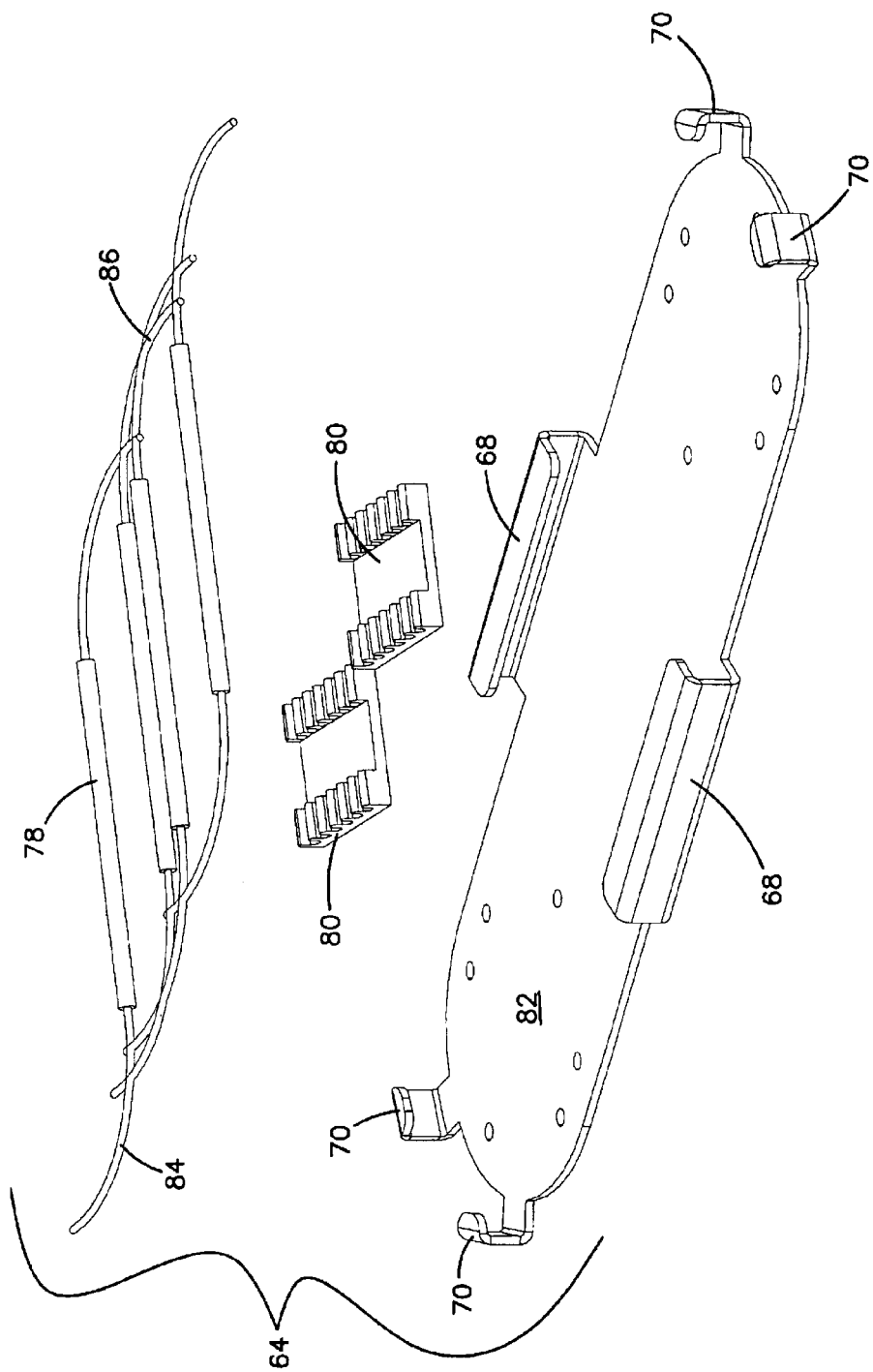
FIG. 17 is an exploded front perspective view of the splice tray of FIG. 15.
Figure 20:
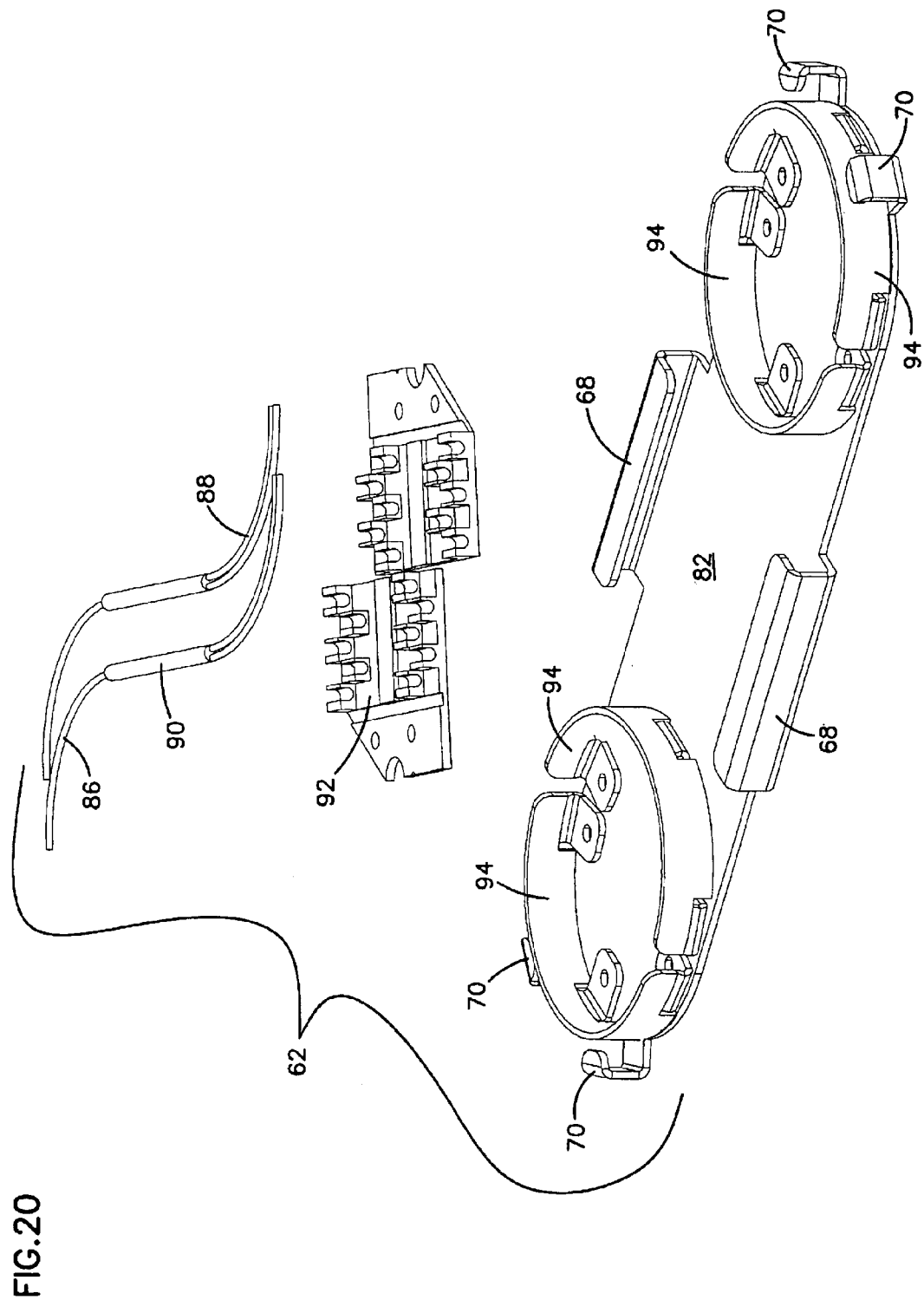
FIG. 20 is an exploded front perspective view of the coupler tray of FIG. 18.

After looping about path 74, the fibers are directed diagonally from path 74 into the center of tray 64 to one of a plurality of splices 78. The fibers from the IFC, represented by segments 84 in FIG. 15, are optically coupled to transition fibers, represented by segments 86 in FIG. 15. Splices 78 are removably held in place by splice blocks 80. Splice blocks 80 are glued or otherwise fixed to tray body 82. The transition fibers extend into path 74 but are routed in a clockwise direction and are looped through path 74 a number of times, preferably at least twice, before transitioning up through one of the C-channels 68 of tray 62 and into path 72. The clockwise loops of the transition fibers in path 74 provides sufficient slack to allow tray 62 to be removed from on top of tray 64 and from splice housing 28.

Once in path 72, the transition fibers extend clockwise about path 72 a number of loops, preferably at least two loops, before extending from path 72 to a plurality of couplers 90. In couplers 90, the transition fibers, represented by segments 86 in FIG. 18, are optically connected to a pair of optical fibers, represented by segments 88 in FIG. 18. The nature of the optical connection between each transition fiber and the pair of fibers transmits a portion of a signal, for example ninety percent of the signal, carried by the transition fiber to one of the pair. The other fiber of the pair, receives the remaining portion of the signal, for example ten percent of the signal. In this example, the fiber carrying the lower percentage of the signal could be used to monitor the quality of the signal being transmitted. Couplers 90 may also provide different levels of signal intensity among the pair of fibers exiting the coupler. By varying the split of signal intensity, coupler 90 may act as a splitter, a monitor, or a wavelength division multiplexer. Couplers 90 are releasably held place on tray 62 by coupler blocks 92. Coupler blocks 92 are glued or otherwise fixed to tray body 82. The pairs of fibers are extended counterclockwise about path 72 for several loops, preferably two, before transitioning down from tray 62 past tray 64 to plate 26.

Tray 62 also includes inner radius limiters 94 mounted adjacent finger 70 to further define fiber path 72. Radius limiters 94 protect fibers within path 72 from being pulled into tight radius bends as tray 62 is removed from splice housing 28. The transition fibers and the pairs of fibers extending from the coupler within path 72 extend out of tray 62 toward plate 26 and tray 64. Lifting tray 62 could potentially cause these fibers to be unduly tensioned and pulled into a tight radius bend. Radius protectors 94 guard against such over-tensioning and bending.

At the level of plate 26, the fiber pairs from the couplers are extended through cable space 40 into the portion of plate 26 between bulkheads 42. These fiber pairs are terminated at connectors 38 and connected to adapters 36 mounted to bulkheads 42. As the IFC cable includes eight strands of optical fiber, each of which were split through the coupler into a pair of fibers, a total of sixteen of the available adapters 36 will receive a connector 38.

It is anticipated that the directions described above with respect clockwise and counterclockwise about the various cable paths may be reversed and the multi-strand optical fiber cable could enter drop-in plate 24 about radius limiter 56 adjacent the right rear corner.

Alternatively, panel 10 could receive a total of eight single strand optical fiber cables in place of the IFC cable. Similar to the routing described above, these single fiber cables would extend into the side of panel 10 and enter drop-in plate 24 from the rear one of the adjacent radius protectors 56, extending through one of the channels 52. Each of the single strand cables is terminated in a mating connector, similar to connector 38. After looping several times about walls 50 of splice housing 28, passing up ramps 30 and through trough 33 in each loop, each of the single fiber cables, would extend to and connect with one of the openings 44 of adapters 36. Connectors 38 connected to the adapters 36 receiving the connectors of the single fiber cable are terminated cables ends of cables extending under cable space 40 into splice housing 28. Once within splice housing 28, these cables are routing in a similar fashion to the multiple fiber strands within the IFC cable, described above.

In a further alternative, when single strand optical fiber cables are used in place of the IFC cable, the transition fiber might extend from the adapter receiving the mating end of the single strand cable directly to the couplers, bypassing splice tray 64. In such an installation, splice tray 64 is not needed and may be left out of panel 10.

After routing through tray 64 and splices 78, and through tray 62 and couplers 90, the fiber pairs linked with the single strand optical fiber cables are directed through cable space 40. As described above, these fiber pairs are terminated at connectors 38 and linked to adapters 36. Up to eight single strand optical fiber cables can be accommodated in panel 10, utilizing all twenty-four adapters 36 mounted to bulkheads 42 (eight adapters 36 to transition the single strand optical fiber cables into splice housing 28, eight to receive the transmission fibers exiting from splice housing 28 and eight to receive the monitor fibers exiting from splice housing 28). A typical arrangement would have the fiber pairs extending from the coupler connected to the adapters directly above the adapter receiving the single strand optical fiber cable whose signal the pair is transmitting.

Referring now to FIGS. 21 through 29, a first alternative panel 110 is shown. Panel 110 is constructed identically to panel 10 with the exception of the arrangement of adapters 36 on a drop-in tray 124, some of which are mounted to a pair of bulkheads 142 and some of which are mounted to a faceplate 120. This arrangement permits the connection of the one fiber of each of the fiber pairs exiting from splice housing 28 to FOT cables without requiring drawer 18 to be moved from the closed position. For telecommunications installations where full-time a fulltime connection of both portions of the signal within an optical fiber circuit are needed, such as when fulltime monitoring of the circuit is desired, the arrangement of all adapters 36 within panel 10 provides security to the connections. In installations where only intermittent or as-needed connecting to the second portion of the signal within the circuit is required, such as in a cross-connect situation, having the adapters 36 connected to one of the fiber in each pair mounted to faceplate 20 and accessible from outside panel 110 may be desirable.

Figure 21:
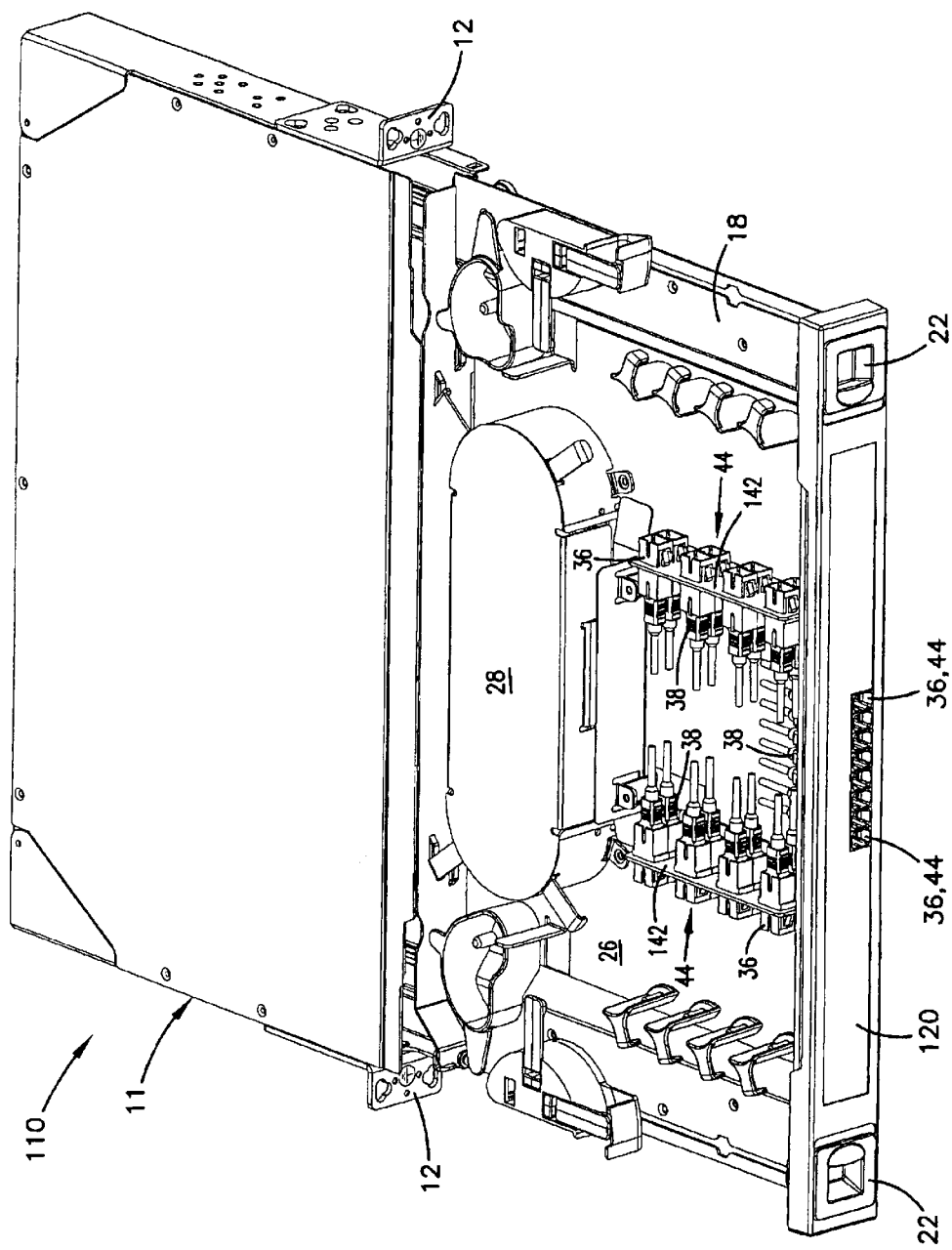
FIG. 21 is a front perspective view of a first alternative embodiment of a telecommunications panel including optical fiber connection devices mounted to a plate, the drop-in plate mounted to a sliding drawer, the drawer in an open position, and the drawer including adapters mounted through the faceplate.
Figure 22:
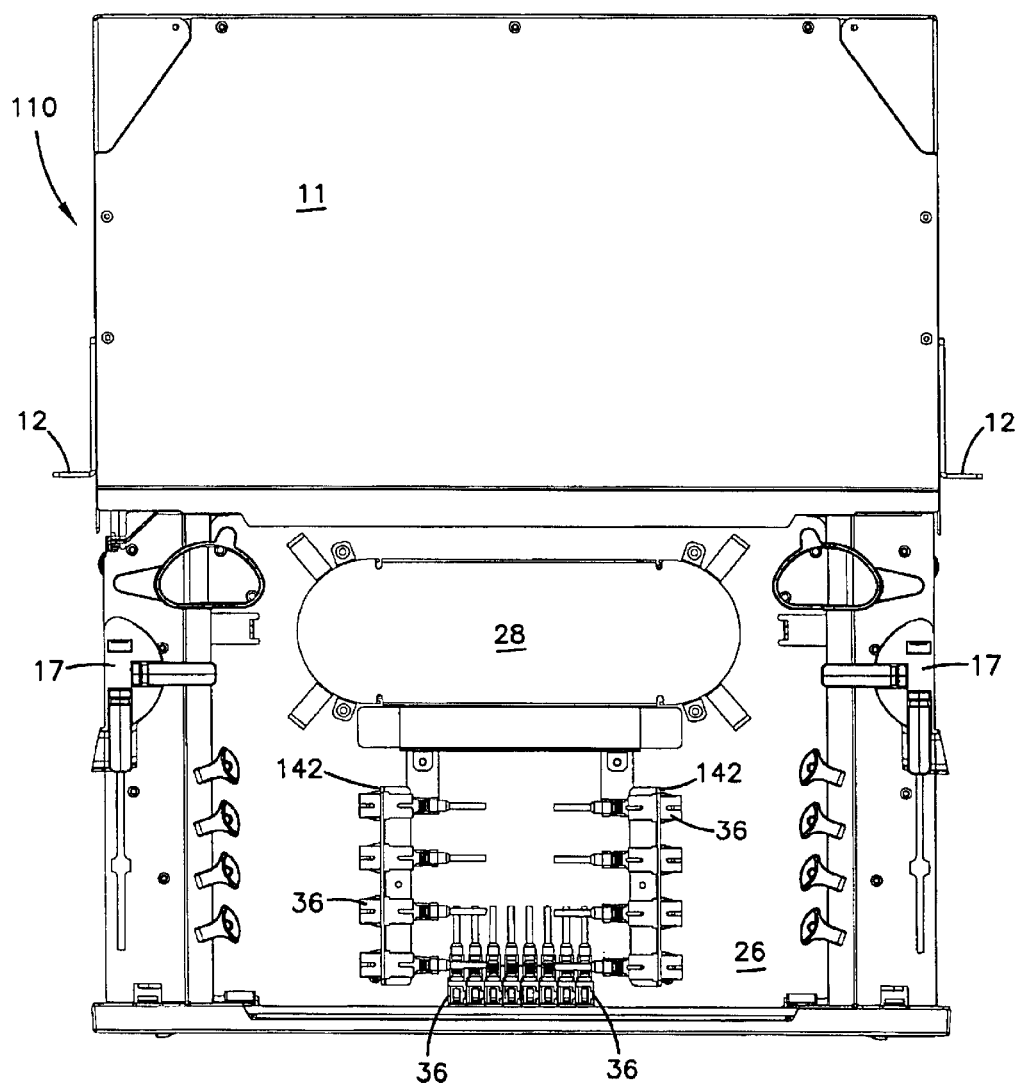
FIG. 22 is a top view of the panel of FIG. 21.
Figure 24:
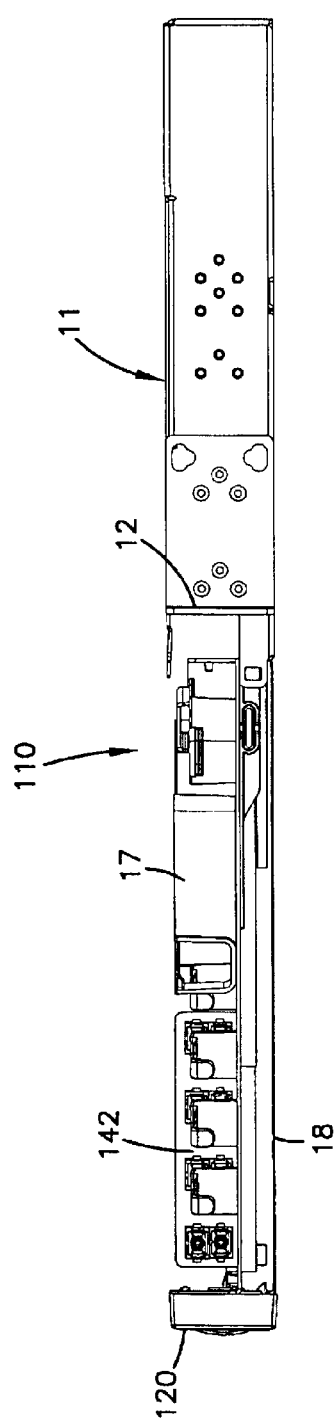
FIG. 24 is a side view of the panel of FIG. 21.
Figure 23:
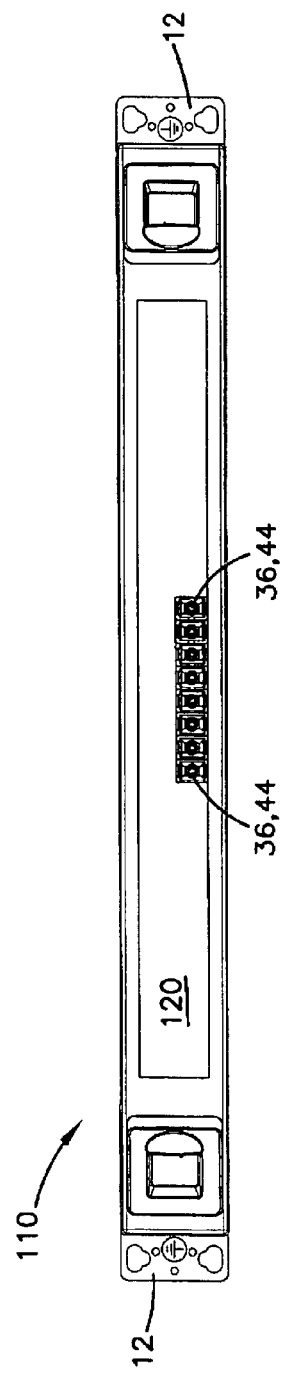
FIG. 23 is a front view of the panel of FIG. 21.
Figure 25:
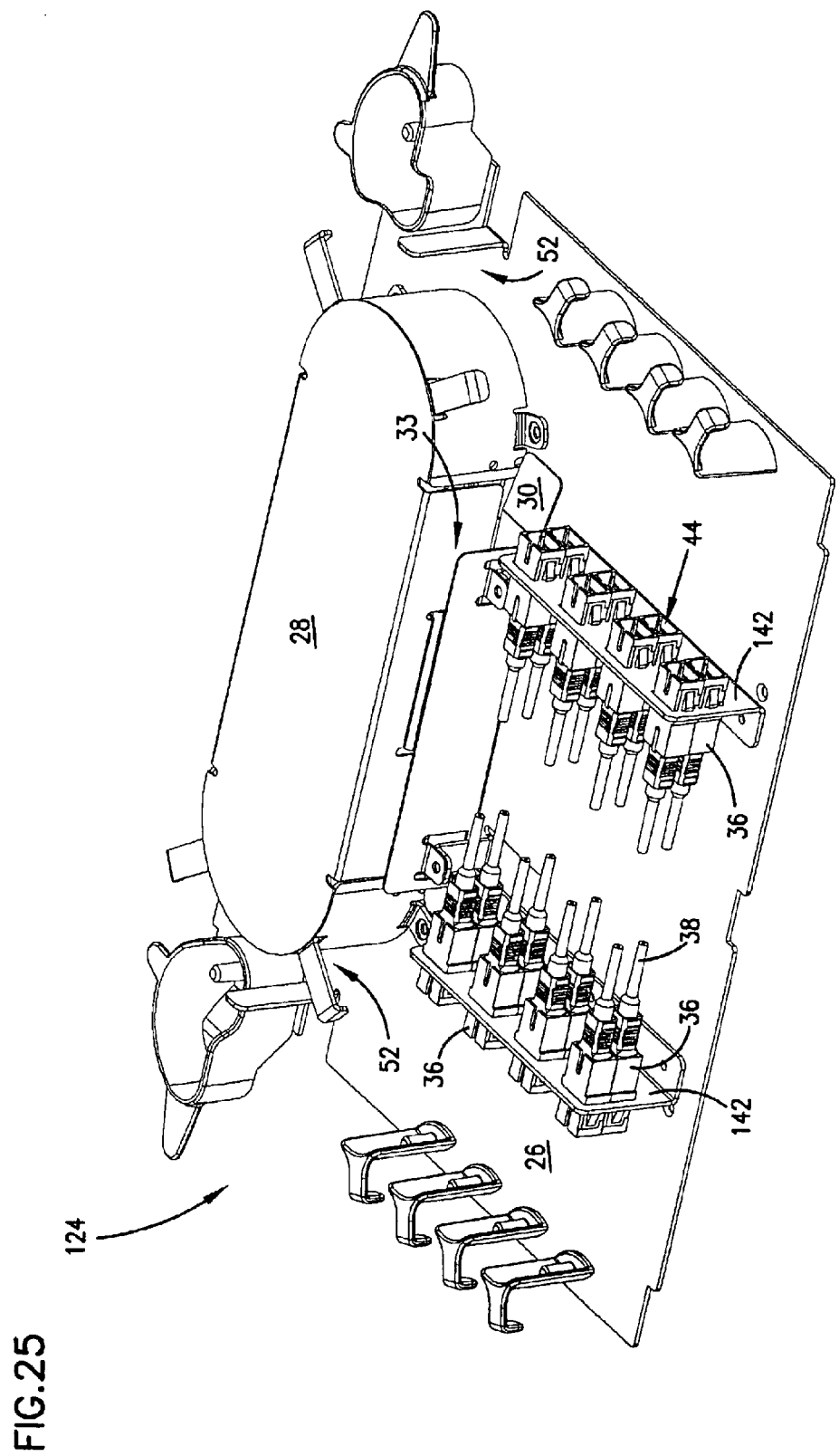
FIG. 25 is a front perspective view of the plate of FIG. 21.
Figure 26:
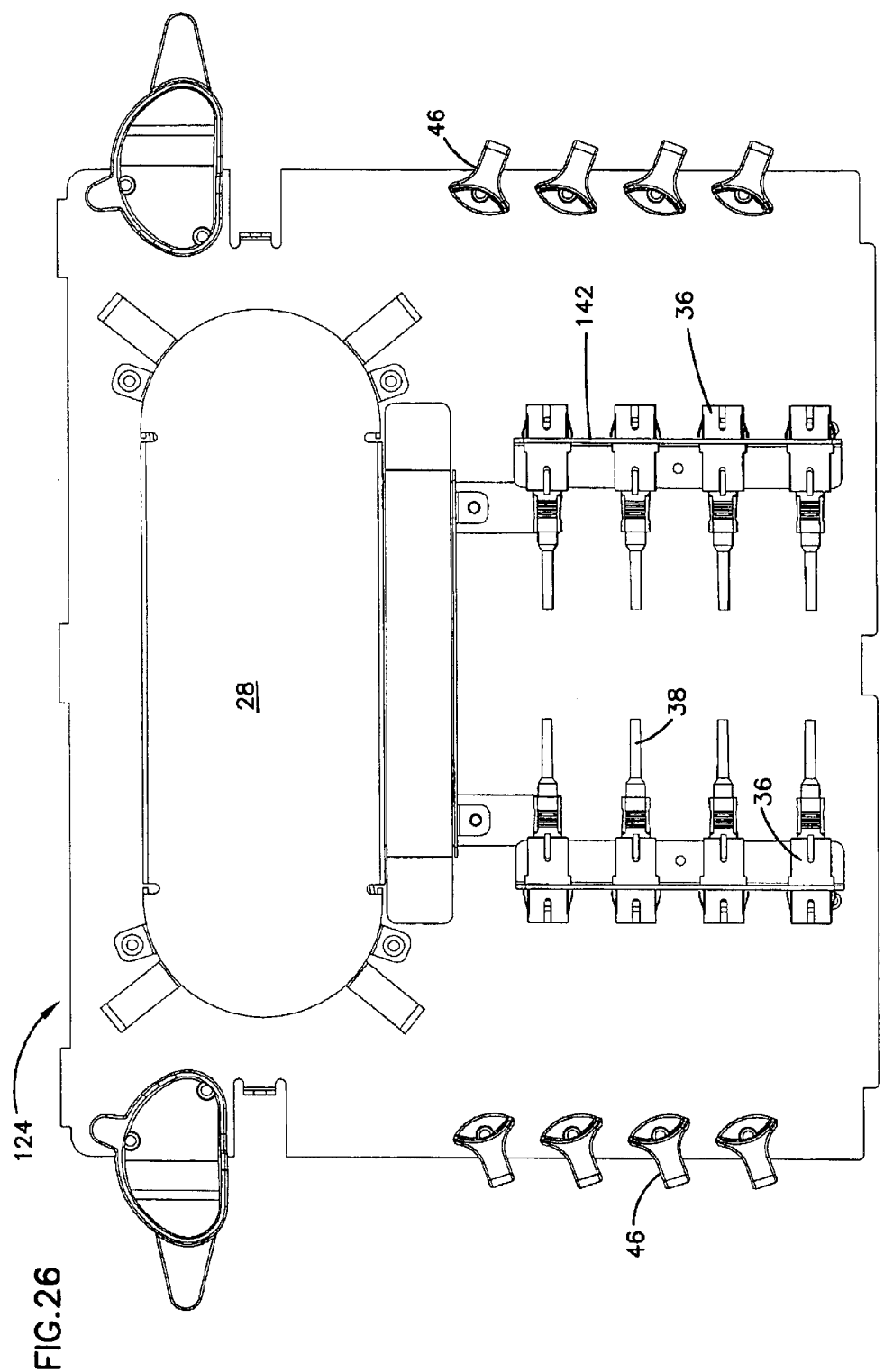
FIG. 26 is a top view of the plate of FIG. 25.
Figure 27:
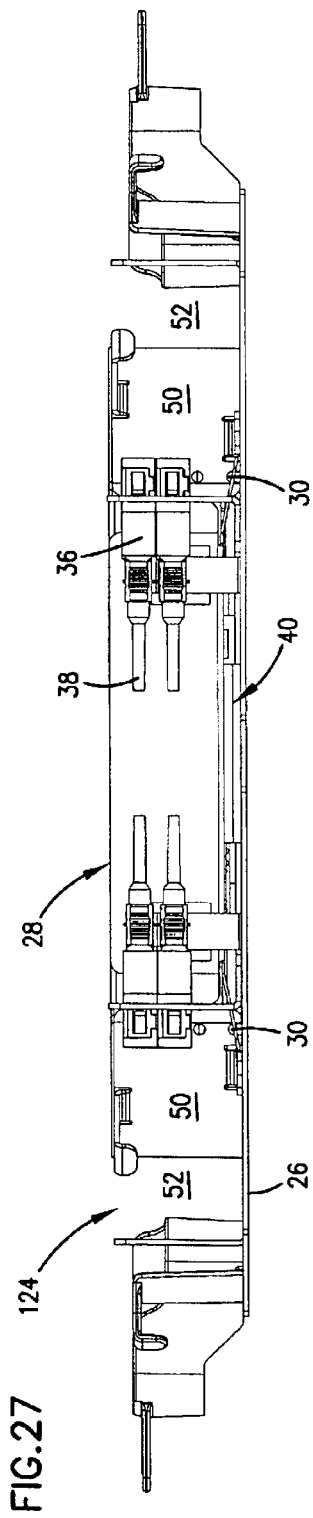
FIG. 27 is a front view of the plate of FIG. 25.
Figure 28:
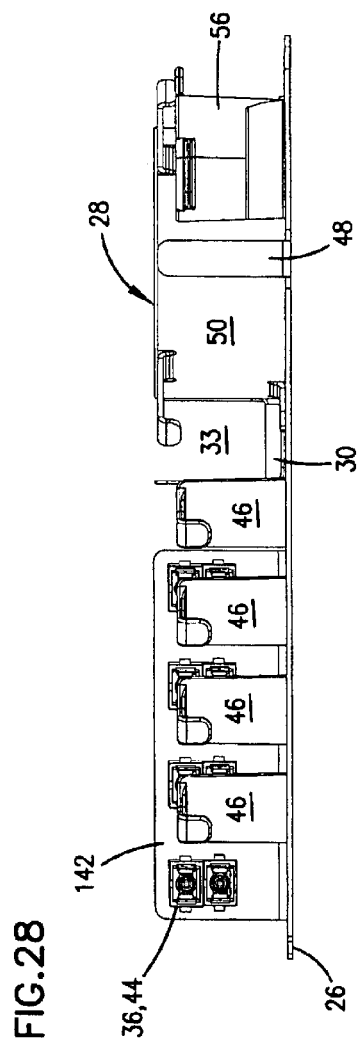
FIG. 28 is a side view of the plate of FIG. 25.
Figure 29:
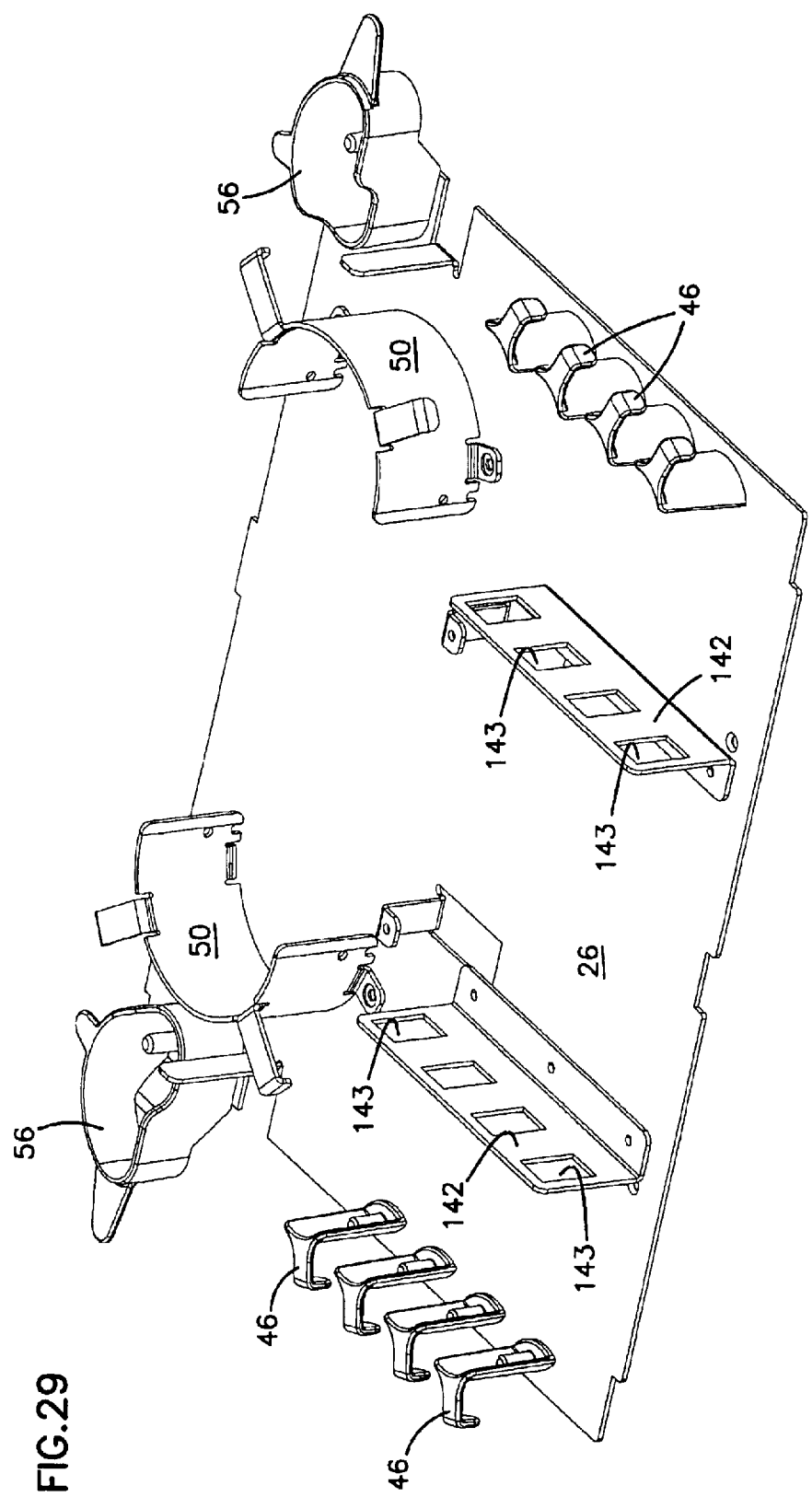
FIG. 29 is a front perspective partially exploded view of the drop-in plate of FIG. 25 with the adapters, the splice housing cover, the splice tray and the coupler tray removed.
Figure 30:
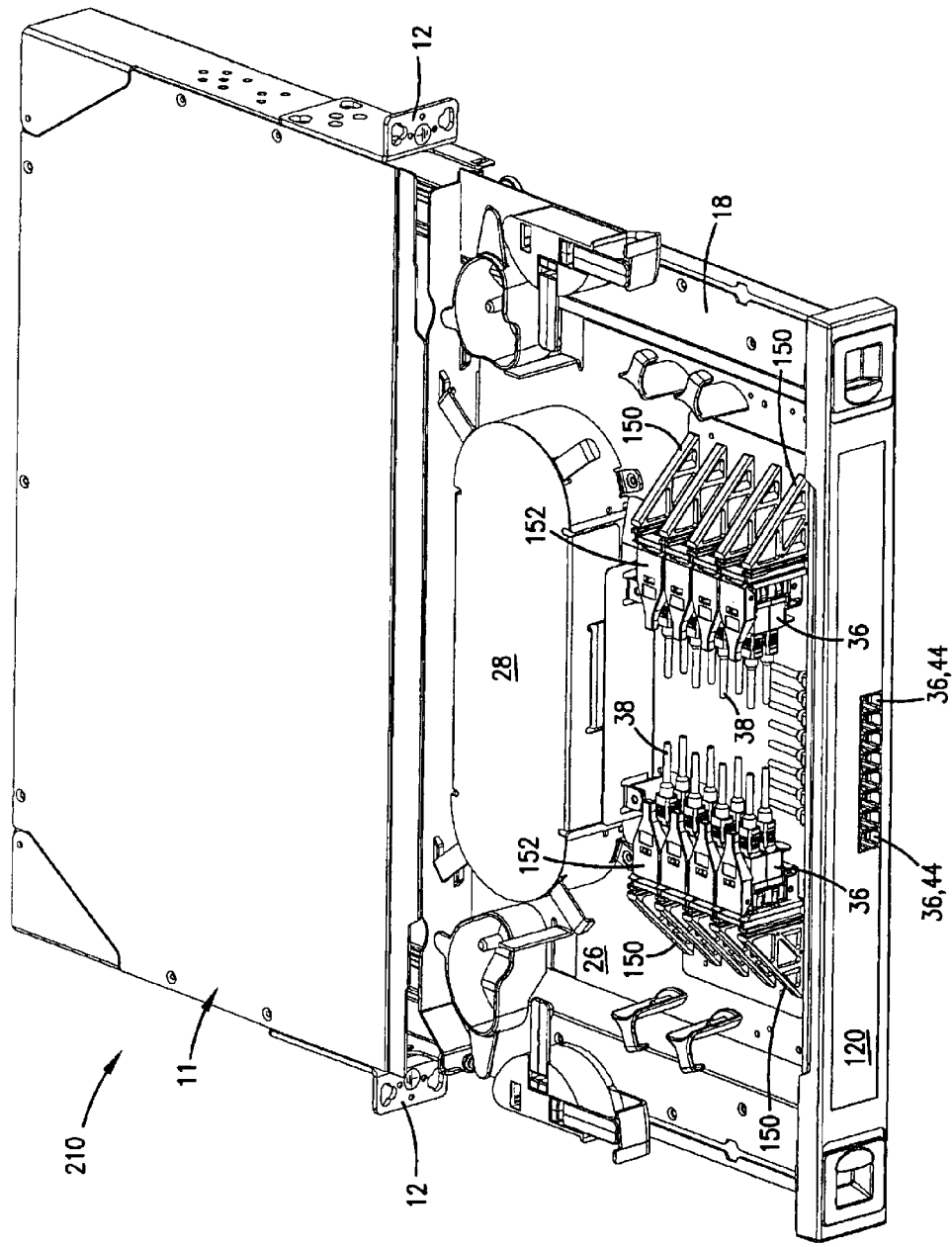
FIG. 30 is a front perspective view of a first alternative embodiment of a telecommunications panel including optical fiber connection devices mounted to a drop-in plate, the plate mounted to a sliding drawer, the drawer in an open position, the drawer including adapters mounted through the faceplate, and the other adapters mounted in vertically sliding arrays within the drawer.
Figure 31:
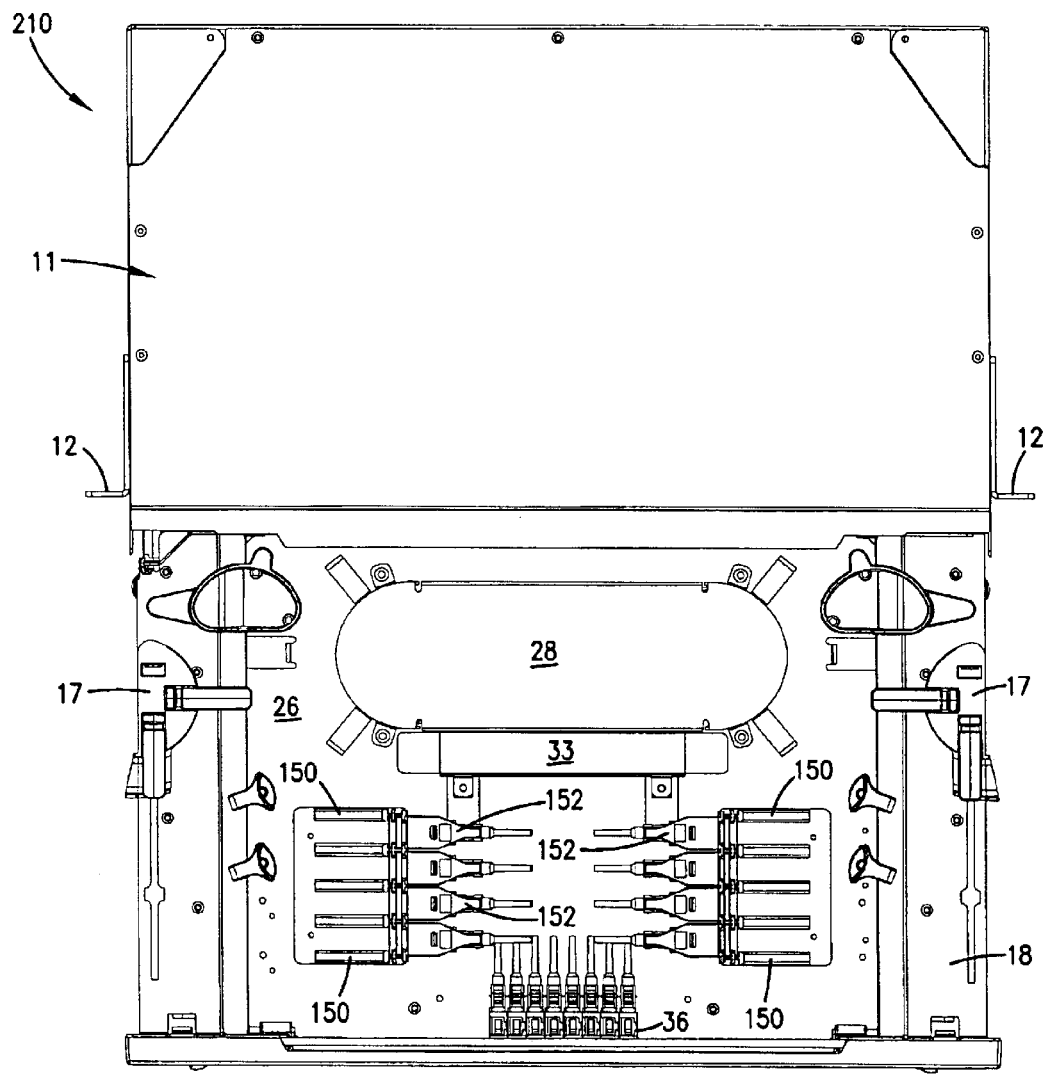
FIG. 31 is a top view of the panel of FIG. 30.
Figure 34:
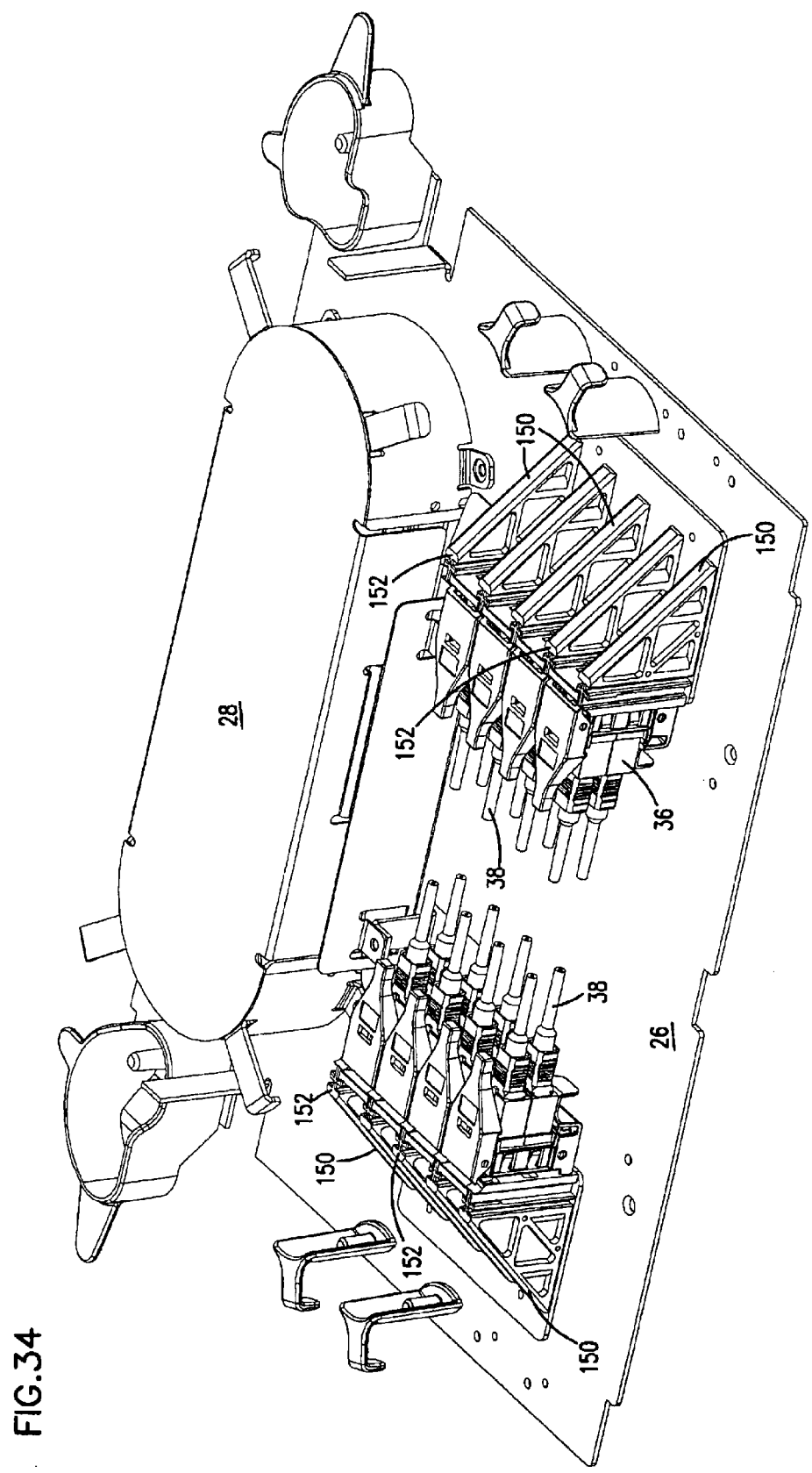
FIG. 34 is a front perspective view of the plate of FIG. 30.
Figure 35:
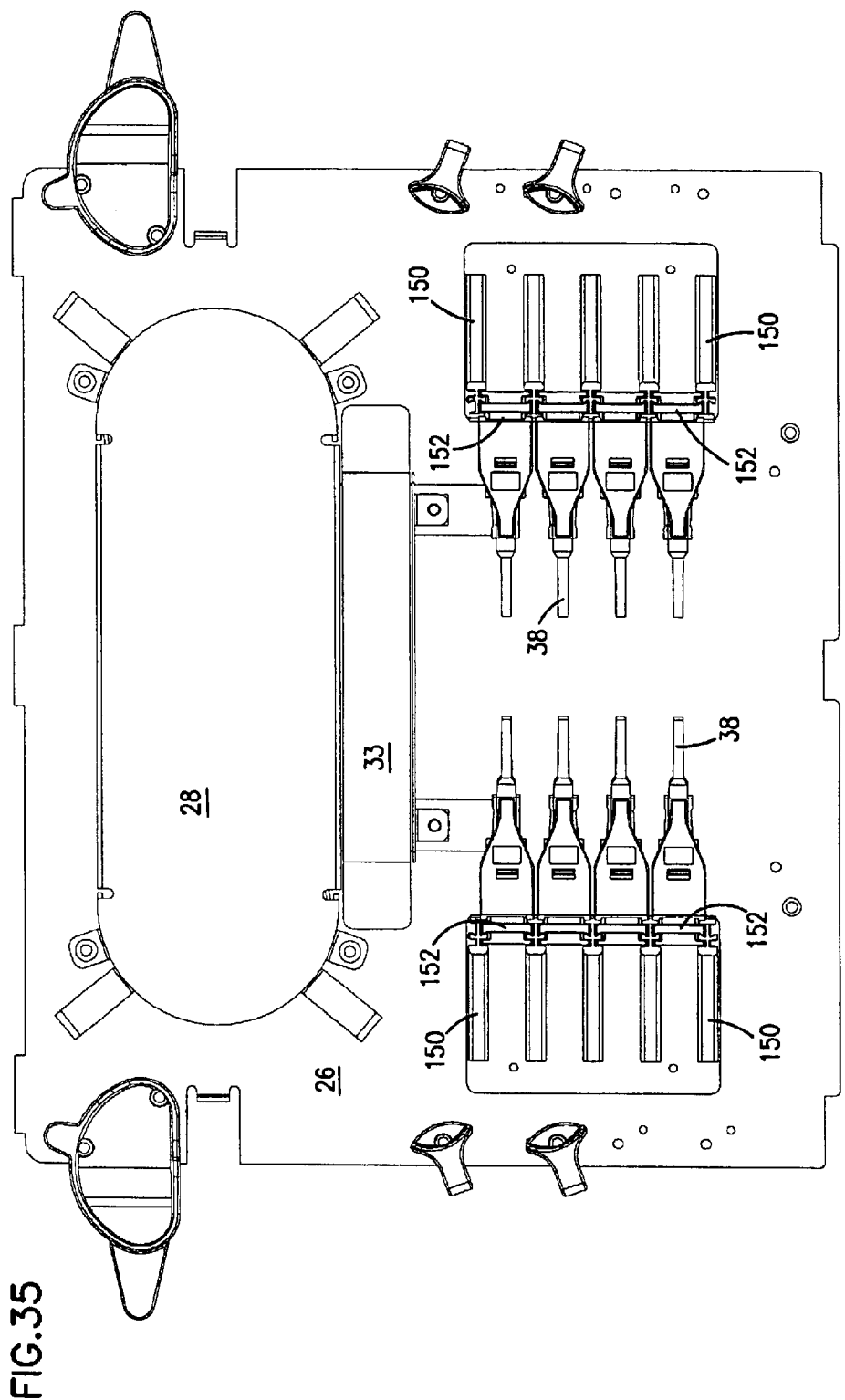
FIG. 35 is a top view of the plate of FIG. 34.
Figure 36:
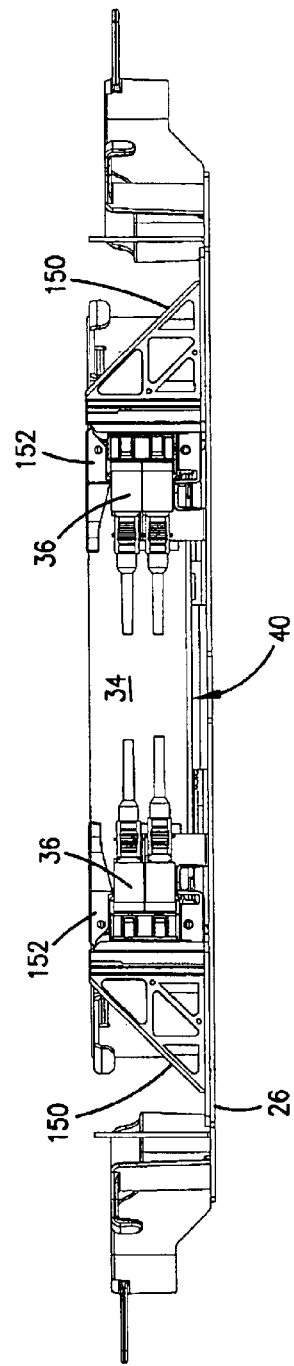
FIG. 36 is a front view of the plate of FIG. 34.
Figure 37:
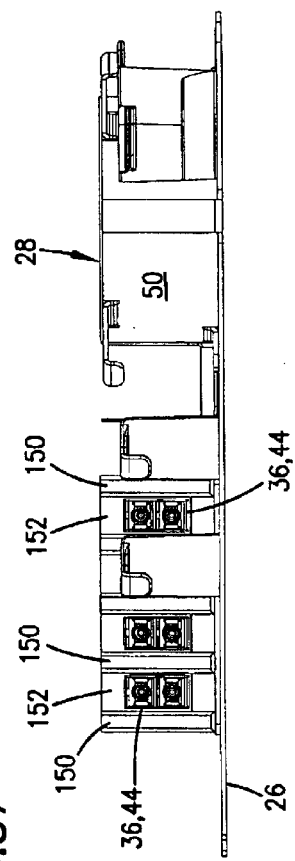
FIG. 37 is a side view of the plate of FIG. 34.
Figure 38:
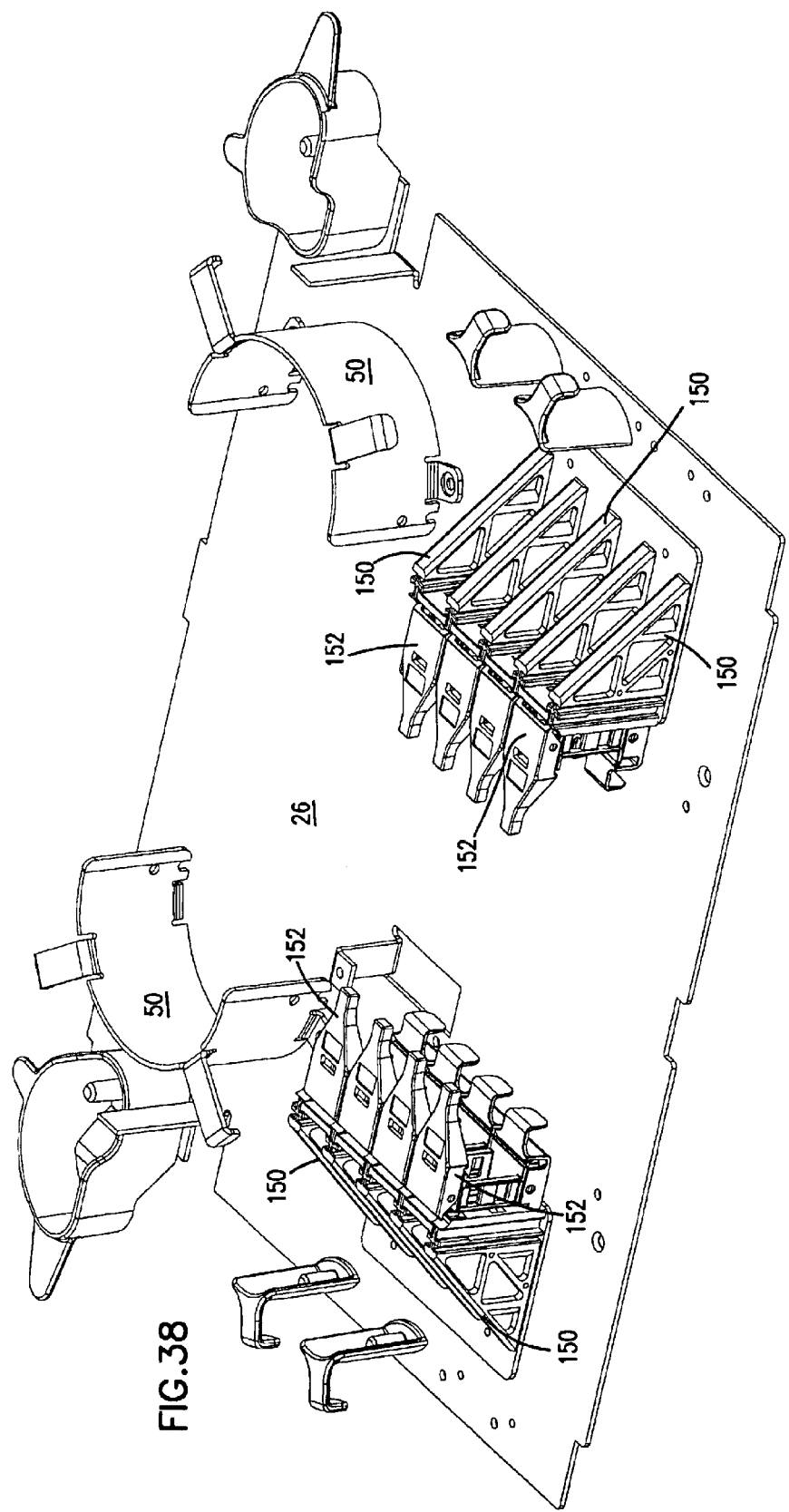
FIG. 38 is a front perspective partially exploded view of the drop-in plate of FIG. 34 with the adapters, the splice housing cover, the splice tray and the coupler tray removed.

As shown in FIG. 21, panel 110 includes the same total of twenty-four adapters 36. Sixteen adapters 36 are mounted to bulkheads 142 and eight adapters 36 are mounted to faceplate 120 so that openings 44 are accessible when drawer 18 is in the closed position. As shown in FIG. 29, bulkheads 142 include a plurality of openings 143 for mounting adapters 36. Each opening 143 is configured to mount two adapters 36.

Referring now to FIGS. 30 through 38, a second alternative panel 210 is shown which is similarly configured to panel 110 with some adapters 36 accessible through faceplate 120. Panel 210 includes a plurality of vertically sliding adapter modules 152 for mounting the remaining adapters 36. Each module 152 mounts up to two adapters 36 and slides vertically between a pair of walls 150. Modules 152 slide up vertically to improve access to the adapters mounted to modules 152 for connection or removal of optical fiber connectors. When slid down, modules 152 do not extend above the height of the splice housing 28 and thus do not interfere with the movement of drawer 18 between the open and closed positions. The use of modules 152 permits adapters 36 to be located closer to each other on tray 26 while still allowing access to connection and removal of connectors.

Commonly owned U.S. Pat. Nos. 5,497,444, 5,717,810 and 5,758,003, and U.S. patent application Ser. No. 09/991,271, the disclosures of which are incorporated herein by reference, further describe and show the structure and features of modules 152 and walls 150.

It is anticipated that panels 10, 110 and 210 may be adapted to receive, splice, couple and monitor more than eight optical fiber circuits. To achieve this higher level of density, additional trays 62 and or 64 may be required within splice housing 28 to allow these additional fibers to be spliced and optically linked with monitor and transmission fibers. Provisions for mounting additional adapters 36 will also be necessary if multi-strand cables with more than eight fibers or if more than eight single strand optical fiber cables are to be connected by panel 10, 110 or 210. These adaptations are anticipated as within the scope of the present invention.

It is also anticipated that multi-strand cables such as IFC cables may be terminated at a connector which will allow the individual fibers within the IFC cable to be directed to the coupler tray without the need for an intervening splice.

With regard to the foregoing description, it is to be understood that changes may be made in detail, especially in matters of the construction materials employed and the shape, size and arrangement of the parts without changing the scope of the present invention. It is intended that the specification and depicted aspects be considered exemplary only, with the true scope and spirit of the invention being indicated by the broad meaning of the following claims.

What is claimed is as follows:

1. A telecommunications panel for connecting fiber optic cables comprising:

an open fronted housing with an interior and a movable drawer slidably mounted within the interior;

a splice tray with a plurality of optical fiber splice locations;

a coupler tray with a plurality of coupler locations, each coupler configured for splitting an optical signal carried on an optical fiber into a transmission fiber and a monitoring fiber;

a plurality of adapters for optically connecting the transmission and monitoring fibers to optical fiber cables;

the movable drawer defining an adapter holding region, a splice tray holding region, and a coupler tray holding region.

2. The telecommunications panel of claim 1, wherein the panel further comprises an entry path for an optical fiber cable from an entry point to the splice tray, the entry path providing bend radius protection for optical fiber cables.

3. The telecommunications panel of claim 2, wherein the entry path includes slack storage for optical fiber cables.

4. The telecommunications panel of claim 1, wherein the panel further comprises a first intermediate cable path between the splice tray and the coupler tray which provides bend radius protection for optical fiber cables.

5. The telecommunications panel of claim 1, wherein the panel further comprises a second intermediate cable path between the coupler tray and the adapters which provides bend radius protection for optical fiber cables.

6. The telecommunications panel of claim 5, wherein the second intermediate cable path includes slack storage for optical fiber cables.

7. The telecommunication panel of claim 1, wherein the panel further comprises an exit path for an optical fiber cable from the adapters to an exit point from the panel, the exit path providing bend radius protection for optical fiber cables.

8. The telecommunications panel of claim 1, wherein the splice tray, the coupler tray and the adapters are mounted to a tray which is received within the movable drawer, the interior is defined by a top, a bottom and a pair of opposing sides and the movable drawer is slidable between open and closed positions.

9. The telecommunications panel of claim 8, wherein the movable drawer tray includes a faceplate which closes a front opening to the interior of the housing when the tray is in the closed position and wherein a plurality of the adapters are mounted to the faceplate.

10. An insert for a telecommunications panel for connecting fiber optic cables, the insert comprising:

a mounting plate configured to be positioned and removably mounted within a movable drawer of the telecommunications panel;

a splice tray mounted to the mounting plate, the splice tray including a plurality of optical fiber splice holder locations;

a coupler tray mounted to the mounting plate, the coupler tray including a plurality of coupler holder locations, each coupler configured for splitting an optical signal carried on an optical fiber into a transmission fiber and a monitoring fiber;

a plurality of adapters mounted to the mounting plate, the adapters for optically connecting the transmission and monitoring fibers to optical fiber cables.

11. The insert of claim 10, further comprising at least one bulkhead mounted to the mounting plate, wherein the adapters are mounted to the bulkhead.

12. The insert of claim 10, further comprising a splice housing mounted to the mounted plate wherein the splice tray and the coupler tray are received in the splice housing.

13. The insert of claim 12, wherein the splice housing includes a pair of opposing end walls which define an exterior cable slack storage structure and provides bend radius protection to cables stored about the structure.

14. The insert of claim 13, wherein the splice housing includes an opening for allowing an optical fiber cable to pass from the exterior cable slack storage structure into an interior of the splice housing and wherein the splice housing includes at least one interior cable path for directing the cable to the splice tray while storing cable slack and providing bend radius protection for the cable.

15. The insert of claim 14, wherein the splice housing includes a second interior cable path for directing an optical fiber cable from the splice tray to the coupler tray while storing cable slack and providing bend radius protection.

16. The insert of claim 15, wherein the exterior cable slack storage structure includes a raised floor portion the splice housing includes a third interior cable path for directing an optical fiber cable from the coupler tray out of the splice housing beneath the raised floor portion to the adapters.

17. A method for preparing the termination and monitoring an optical fiber cable comprising the steps of:

providing an outside plant cable containing at least one strand of optical fiber;

extending the outside plant cable into a telecommunications connection plate;

receiving the at least one strand of optical fiber from the outside plant cable into a splice tray mounted to the connection plate and optically connecting the strand of optical fiber to a transition fiber;

extending the transition fiber from the splice tray to a coupler tray mounted to the connection plate and optically connecting the transition fiber to a pair of optical fibers;

extending each of the pair of optical fibers from the coupler tray to an adapter mounted to the connection plate.

18. The method of claim 17, wherein the plate is mounted within a telecommunications equipment panel.

19. The method of claim 18, wherein the telecommunications panel includes a pair of opposing sides with flanges extending from each of the sides adapted for mounting the panel to a telecommunications equipment rack.

20. The method of claim 18, wherein the telecommunications equipment panel includes a housing with atop, a bottom, and a pair of opposing sides defining a front opening and the plate is mounted within a drawer slidably mounted within the opening.

21. The method of claim 20, wherein the drawer is slidable between an open and a closed position.

22. The method of claim 21, wherein adapters connected to the one of the pair of optical fibers extending from the coupler tray are mounted to a faceplate of the drawer and are accessible from outside the panel when the drawer is in the closed position.

* * * * *

UNITED STATES PATENT AND TRADEMARK OFFICE
CERTIFICATE OF CORRECTION

PATENT NO.   : 6,804,447 B2
DATED        : October 12, 2004
INVENTOR(S)  : Smith et al.

It is certified that error appears in the above-identified patent and that said Letters Patent is hereby corrected as shown below:

Column 8,
Line 66, "drawer tray includes" should read -- drawer includes --

Column 10,
Line 29, "with atop," should read -- with a top, --

Signed and Sealed this

First Day of March, 2005

JON W. DUDAS
*Director of the United States Patent and Trademark Office*